US012360282B2

(12) United States Patent
Olsson et al.

(10) Patent No.: US 12,360,282 B2
(45) Date of Patent: Jul. 15, 2025

(54) NATURAL VOICE UTILITY ASSET ANNOTATION SYSTEM

(71) Applicant: SeeScan, Inc., San Diego, CA (US)

(72) Inventors: Mark S. Olsson, La Jolla, CA (US); Alexander L Warren, Escondido, CA (US); Michael P. Nichols, Temecula, CA (US)

(73) Assignee: SEESCAN, INC., San Diego, CA (US)

( * ) Notice: Subject to any disclaimer, the term of this patent is extended or adjusted under 35 U.S.C. 154(b) by 244 days.

(21) Appl. No.: 18/354,926

(22) Filed: Jul. 19, 2023

(65) Prior Publication Data

US 2024/0027646 A1    Jan. 25, 2024

Related U.S. Application Data

(60) Provisional application No. 63/368,879, filed on Jul. 19, 2022.

(51) Int. Cl.
*G01V 15/00*    (2006.01)
*G06F 3/02*    (2006.01)
(Continued)

(52) U.S. Cl.
CPC .......... *G01V 15/00* (2013.01); *G06F 3/0484* (2013.01); *G06F 3/167* (2013.01); *G10L 15/18* (2013.01);
(Continued)

(58) Field of Classification Search
USPC ..................................................... 704/1–504
See application file for complete search history.

(56) References Cited

U.S. PATENT DOCUMENTS 5,629,626 A * 5/1997 Russell ................... G01V 3/08
342/357.68
10,332,513 B1 * 6/2019 D'Souza ................. G10L 15/22
(Continued)

FOREIGN PATENT DOCUMENTS

WO    WO 2019/136390    7/2019
WO    WO-2024020440 A1 *  1/2024  ............. G01S 17/08

OTHER PUBLICATIONS

International Searching Authority, "Written Opinion of the International Searching Authority" for PCT Application No. PCT/US2023/070491, Oct. 9, 2023, European Patent Office, Rijswijk.

*Primary Examiner* — Marcus T Riley
(74) *Attorney, Agent, or Firm* — Steven C. Tietsworth, Esq.; Michael J. Pennington, Esq.

(57) ABSTRACT

Systems and methods for annotating, also known as tagging, visually identifiable objects using natural language (i.e. spoken voice) are provided. More specifically, but not exclusively, this disclosure relates to systems and methods for tagging identified objects related to underground utilities and assets, and communication systems. Once tagged, data representing identified objects can be stored, transmitted, and/or mapped. In an exemplary embodiment, a utility service worker or other personnel may walk or drive around an area of interest using utility locating equipment or systems to collect data. As data is being collected, the user may visually identify utility related or other items using a laser pointer, and then use their voice to tag items of interest. A headset including a microphone may be provided for capturing the user's voice. Hardware and/or software may be provided for processing tagged items, and relating them to a specific location, and/or utility asset.

26 Claims, 20 Drawing Sheets

(51) Int. Cl.
*G06F 3/0484* (2022.01)
*G06F 3/16* (2006.01)
*G10L 15/08* (2006.01)
*G10L 15/18* (2013.01)
*G10L 15/22* (2006.01)
*H04R 1/08* (2006.01)
*H04R 1/10* (2006.01)
*H04R 5/033* (2006.01)

(52) U.S. Cl.
CPC ............... *G10L 15/22* (2013.01); *H04R 1/08* (2013.01); *H04R 1/1008* (2013.01); *H04R 1/1041* (2013.01); *H04R 1/1083* (2013.01); *H04R 5/033* (2013.01); *G06F 3/02* (2013.01); *G10L 2015/088* (2013.01); *H04R 2420/07* (2013.01); *H04R 2460/01* (2013.01); *H04R 2460/13* (2013.01)

(56) References Cited

U.S. PATENT DOCUMENTS

| | | | |
|---|---|---|---|
| 10,977,493 B2 * | 4/2021 | Speasl | H04L 9/0894 |
| 11,402,871 B1 * | 8/2022 | Berliner | G06F 3/04886 |
| 12,007,491 B2 * | 6/2024 | Cole | G01S 19/45 |
| 12,078,053 B2 * | 9/2024 | Cole | E21B 7/046 |
| 2011/0006772 A1 * | 1/2011 | Olsson | G01R 19/00 |
| | | | 324/326 |
| 2017/0363764 A1 * | 12/2017 | Aldridge | G01V 3/104 |
| 2019/0004203 A1 * | 1/2019 | Olsson | G01V 3/165 |
| 2019/0236365 A1 * | 8/2019 | Speasl | G01S 17/89 |
| 2020/0257862 A1 * | 8/2020 | Kar | G06F 40/284 |
| 2022/0253263 A1 * | 8/2022 | Noam | G06F 1/1662 |
| 2022/0253266 A1 * | 8/2022 | Berliner | G06F 3/04886 |
| 2022/0253759 A1 * | 8/2022 | Berliner | G06F 1/1656 |
| 2022/0254118 A1 * | 8/2022 | Berliner | G06F 1/1662 |
| 2022/0256062 A1 * | 8/2022 | Berliner | G06Q 10/0631 |
| 2023/0176244 A1 * | 6/2023 | Olsson | G01V 3/08 |
| | | | 324/232 |
| 2024/0027646 A1 * | 1/2024 | Olsson | G01V 15/00 |

\* cited by examiner

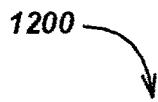

```
1200 ─╮
      ↓
```

```
┌─────────────────────────────────────────────────────────────┐
│  Talk into Microphone to name Tagged Object.                │
│                                                        1210 │
└─────────────────────────────────────────────────────────────┘
                              │
                              ▼
┌─────────────────────────────────────────────────────────────┐
│ Using a Voice Recognition Application, optionally Repeat    │
│ Tagged Object back to a user via an Audio Output Element.   │
│                                                        1220 │
└─────────────────────────────────────────────────────────────┘
                              │
                              ▼
┌─────────────────────────────────────────────────────────────┐
│ Use Voice Editing Application to optionally Verbally        │
│ Correct any text as needed.                                 │
│                                                        1230 │
└─────────────────────────────────────────────────────────────┘
                              │
                              ▼
┌─────────────────────────────────────────────────────────────┐
│ Use Voice or Manual User Interface to optionally save or    │
│ discard the Tagged Object.                                  │
│                                                        1240 │
└─────────────────────────────────────────────────────────────┘
```

FIG. 12

NATURAL VOICE UTILITY ASSET ANNOTATION SYSTEM

CROSS-REFERENCE TO RELATED APPLICATIONS

This application claims priority under 35 U.S.C. § 119(e) to U.S. Provisional Patent Application Ser. No. 63/368,879 entitled NATURAL VOICE UTILITY ASSET ANNOTATION SYSTEM, filed on Jul. 19, 2022, the content of which is hereby incorporated by reference herein in its entirety for all purposes.

FIELD

This disclosure relates generally to systems and methods for annotating, also known as tagging, visually identifiable objects using natural voice. More specifically, but not exclusively, this disclosure relates to systems and methods for tagging identified objects related to underground utilities and assets, and communication systems. Once tagged, data representing and associated with the identified objects can be stored, transmitted, and/or mapped.

BACKGROUND

FIG. 1 illustrates a method for collecting multifrequency electromagnetic data from buried objects associated with utilities or communication systems, as known in the prior art. Underground objects may include power lines, electrical lines, gas lines, water lines, cable and television lines, and communication lines. Power and electrical lines ("lines") may be single phase, three phase, low or high voltage, and low or high current. Data collected from various underground objects may be single frequency or multifrequency data. Lines may be passively located by using a receiver to detect EM (electro-magnetic) signals that a line being traced already produces, or actively located by using a transmitter to induce a signal into a line, and then using a receiver to detect EM signals from the induced lines. Various lines may be publicly or privately owned. There is a need to obtain and correlate more data related to utility locating.

Accordingly, the present invention is directed towards addressing the above-described problems and other problems associated with quickly and accurately obtaining and processing accurate utility location data.

SUMMARY

This disclosure relates generally to systems and methods for annotating, also known as tagging, visually identifiable objects using natural language (i.e. spoken voice). More specifically, but not exclusively, this disclosure relates to systems and methods for tagging identified objects related to underground utilities and assets, and communication systems. Once tagged, data representing identified objects can be stored, transmitted, and/or mapped.

Collected multifrequency data may be obtained by using a Geo-Locating Receiver (GLR), often referred to as a "utility locator device" or "utility locator" or "locator," or other devices and methods well known in the art. Collected data may form a suite of data which may include, for example, multifrequency electromagnetic data, imaging data, mapping data which may include depth and orientation data, current and voltage data, even and odd harmonics, active and passive signals, spatial relationships to other lines and objects, fiber optic data, etc. The ability to go out in the field and locate various underground objects or assets associated with utilities and communication systems, store large amounts of data, and quickly and accurately analyze the data to determine asset characteristics such as the types of underground assets, electrical characteristics, what the assets are connected to, and who owns them is currently very limited.

Many utility assets are often mislabeled which often results in damage as a result of digging or other construction actions in the wrong location. These mistakes cost the utility and construction industry millions of dollars a year in damaged equipment, and may result in injury or even death to utility and construction workers.

When a user such as a utility service worker, contractor, surveying personnel, construction worker, etc., is in the field using a GLR or other utility locating device or system (sometimes referred to as a performing a locating operation, locate operation, or simply just locating or locate), it is often desirable to collect as much utility related information as possible in the easiest, quickest, and most efficient manner possible. The goal is often not just to collect utility related data, but to use data to create a map of the utility equipment and assets that have been located. When making utility maps a critical question to try to answer is "What utility are you locating?" Any maps obtained from collected data are of a lower value if the located utilities are unknown in terms of type. The injury or death hazard, and the cost of incurred damages often very much depends on the type of utility in the ground. Utilities can often be identified by the things they are covered with (metal boxes or manhole or vault covers) or attached or run to (aka endpoints), as well as other visually viewable objects. These visually viewable and identifiable objects above the ground, often referred to as ground truth data, utility objects, or utility assets, can often help identify what is below the ground. Utility objects such as markings and signage either written directly on utility related equipment "assets", or covering or attached to utility assets may include labeling such as WATER, GAS, SEWER, STORM DRAIN, etc., and/or the name of the asset owner, e.g. AT&T, SDG&E, Verizon, Crown Castle, Bell Systems Time Warner, Cox, San Diego City or other cities or municipalities, CALTRANS etc. Other visually identifiable objects include but are not limited to Water Meters, Electrical Meters, Fire Hydrants, Utility Boxes, Stop Signs, Road Signs, Traffic Signs, Street Signs, Traffic Signals and Traffic Control Equipment including Traffic Cameras, Control Sensors, Signal Loops, Light Beam Sensors, etc., Street Lights, Power Poles and Lines, Radio and Cellular Towers, Transformers, Antennas, Manhole Covers, Junction Boxes, Connecting or Routing Terminals, Utility Meters, Observable Connections, Line and Pipe Paths, Conduits, Cracks in asphalt, concrete, or other surfaces, and the like. Other examples include but are not limited to manholes or valve covers of an exposed pipe or cable, or even a crack in an asphalt surface indicating where a trench was cut to bury some unknown utility. It may also include old paint placed on the ground from a previous utility locating operation, or even fresh paint placed during a current utility locating operation, mapping operation, or documenting process.

Basically, any physical structure that can be identified as possibly being related to the presence of a utility, utility system, or a communication system, can be considered a utility object that can be tagged using a pointer, and voice annotated (named or described).

If utility locating equipment identifies electromagnetic points that can be spatially associated (typically simply by proximity) with any ground truth data or attributes that has been logged or annotated/tagged, then they can be automatically identified with an associated probability or quality metric.

There are two main problems that are involved with utility locating. The first problem is related to identifying the type of utility located. Has a user located a gas line, water line, sewer or other pipe line, etc.? What has actually been located if you have identified the end points of a line? Utility locating personnel are often taught that when locating a utility asset, it is necessary to verify that you have located the correct thing. As an example, if you hook up a transmitter configured to couple one or more signals at one or more frequencies at the far end of a utility line, there is a great deal of certainty that a GLR or other utility locator detecting the same signal(s) at those same frequency(ies) elsewhere would indicate the original utility line. For instance, if you get to a gas line and hook up a transmitter to that line, you can determine that you are still connected to that specific gas line when sensing the same signal(s) at known transmitter frequency(ies) via a GLR or other utility locator, or if you hook up a transmitter to a cable TV line, you can determine if you are still on the correct line, i.e. the cable TV line, or if you are no longer on the correct utility line when sensing the presence or absence of the same signal(s) at known transmitter frequency(ies) via a GLR or other utility locator.

By having these utilities tagged, not just by voice, but actually associated with a specific utility, a greater accuracy identifying utility lines or assets can be achieved. Annotated or tagged utility assets offer cross-checking opportunities. As an example, if a gas line has been "tagged" as "gas" multiple times, but one time it was accidentally tagged as "water", there is a much better chance that it is actually a gas line. This offers a built-in quality metric of sorts. Redundancy is a good strategy to check, and therefore, ensure high quality, accurate data. Annotated utility assets can also be used as part of training data sets and/or ground truth data sets for AI (Artificial Intelligence) systems. It is important that data sets provided to AI have a high level of quality. The AI systems can then be used to process large amounts of data related to utility assets both above and below the ground. AI would be another tool to ensure data accuracy/integrity, and help predict the location and type of utility assets with a high probability of accuracy. AI can be used to construct or reconstruct utility mapping to determine with a high probability which data is associated with which utility.

Many utility assets are often mislabeled which often results in damage as a result of digging or other construction actions in the wrong location. These mistakes cost the utility and construction industry millions of dollars a year in damaged equipment, and may result in injury or even death to utility and construction workers.

It is often a correct assumption that an individual collecting data using utility locating equipment or systems, e.g. Geo® locating systems and/or hardware, is by definition somewhat of an expert at visually identifying ground-level assets related to utilities. One of the fastest, easiest, and most natural way an individual can communicate what they are seeing is by using natural language, i.e. their own words.

In one aspect, a utility service worker or other personnel may walk or drive around an area of interest using utility locating equipment or systems (utility locator) to collect data. The locator would include a positioning element or system. Examples of such locating systems include satellite positioning systems such as GPS, GLONASS, GALILEO, GNSS, inertial positioning systems such as FUSION, and automated vehicle location systems such as SLAM (simultaneous localization and mapping), and the like. As data is being collected, the user may visually identify utility related or other items using a laser pointer, and then use their voice to tag items of interest. Tagging a utility object by aiming the laser pointer at the object causes a position measurement to be taken at the location of the laser point or dot. The position measurement may include determining the actual position of the laser tagging point on a tagged utility object in the world frame. A positioning system, e.g. GNSS may be used to obtain positioning data at the starting point of the laser. GNSS position data, as well as pose and orientation data at the starting point of the laser, as well as the distance and direction from the starting point to the laser point, dot, or end-point, may all be used to determine the actual position of the laser tagging point on the tagged utility object in the world frame.

A headset including at least one microphone may be provided for capturing the user's voice. Hardware and/or software may be provided for processing tagged items, and relating them to a specific location, and/or utility asset.

As an example, a utility service worker or other personnel collecting utility data with a locator (a "user") may identify an object they want to tag, for instance a fire hydrant. The user would than point at the fire hydrant using a laser pointer, or laser range finder, and speak the words "fire hydrant" into a microphone. The microphone may be part of a wireless or wired head set in communication with the locator, or the microphone could be attached to, or part of the locator. Optionally, as the user is talking, either in real time or shortly thereafter, the words spoken "fire hydrant" could be optionally shown to the user on a display which could be attached to, or part of the locator, or could be a separate remote device. If desired, the microphone could be part of the remote display. The remote display could be wired or wireless. Once the user stops talking, software, either custom or well known and easily available, e.g. SIRI, ALEXA, BIXBY, etc., would optionally repeat the words to the user. For instance in this example, the words "fire hydrant" would repeated back to the user via a speaker or other audio output device as a way of confirming what the user has said. The user would then have the option of accepting the terms spoken, or rejecting them. The ability to accept (tag) or optionally reject (discard) a term could be controlled via voice, and/or manually inputted with a control panel. The control panel could be remote, or attached to or part of the locator, or locating system. In some embodiments, options such as audio or written (text) cross-checking to determine if a tagged item has been previously tagged and/or if it was annotated correctly, could be provided.

In one aspect, a user could quickly and efficiently identify and tag a large number of utility related items. As an example, a user walking around with a laser could press a tag button or say the word tag, and say, e.g. property marker, gas valve, gas tank, fire hydrant, stop sign, water meter, etc. as fast as they could go to tag those items. Then, the user could be provided with an application with a pin marker to hover over those specific items on a display, with a real map, e.g. one that has been previously scanned in, or a virtual map.

In one aspect, a user may drive through an intersection with a laser range finder with a locating system, a GLR, or a hitch system integral with, or attached to the back of a vehicle. Range finders may include any devices or methods for determining distance. For instance, distance may be determined using acoustical and/or optical devices or methods. Distance may also be determined using radar, lidar, etc.

In one aspect, a mobile device, e.g. a mobile phone, laptop, etc., may include built in optical detection such as laser or lidar, or infrared detection technology such as IR Grid, and other known IR detection systems. These optical detection systems can be used to detect and/or recognize specific utility assets, and determine the position of those detected assets. As an example, a phone with optical detection may detect a manhole, fire hydrant, valve box, or other utility asset, and may then annotate the item it has detected in a database. The presence of the object detected may also be displayed, and/or verbally announced to a user via a speaker or other output sound device. Lidar may also be used for three dimensional imaging to generate a three dimensional image of an asset.

One skilled in the art would appreciate that there are many well known devices and methods for determining the distance between two or more points or objects. Utility items may be tagged at that time by describing them verbally, or if previously tagged, they could be presented on a user display or map as they approached those items, or they could all be displayed on a map simultaneously. It would be understood by those skilled in the art that the display could have settings and filters to allow a user to see complete sets of tagged items, subsets of items, items related to specific equipment, e.g. traffic signal equipment, or any other such desired combination. Maps could also include natural landmarks, traffic signs, road lay outs, etc.

In one aspect, a user such as a utility worker, construction worker, land surveyor, civil engineer, or other utility, planning, or construction personnel, may be provided with a headset with a microphone, and a visible optical pointer, such as a laser pointer, for interfacing with a utility locating apparatus or system (locator). The laser may be a remote/separate handheld device, or may be integrated (built into or attached to) the locator. While walking around taking EMF or other measurements with the utility locator, a user may use the laser pointer to point to a utility object they want to tag or annotate and describe or name the object they are pointing at by speaking into the microphone. For instance, a user may point to a utility electrical meter using a laser pointer, and say the words "electrical meter". Using voice recognition software the system would repeat the words back to the user. The user would then have the option to keep/save the tagged utility object, or discard it.

In one aspect, the user could use the voice recognition software as an interface with the locator, and simply say the words "save", "keep", "delete", "discard", etc. It would be understood by those of ordinary skill in the art that voice recognition software could be used for any number of languages, e.g. English, Spanish, French, Japanese, Russian, Portuguese, etc.

In some embodiments a control interface could be on or attached to the locator itself, on or attached to the headset, or a completely separate remote control device such as a handheld controlled interface, a cellular or mobile phone, a laptop, tablet, or the like. If a separate remote device is used, e.g. a cellular phone, then the microphone and/or speaker in the phone could be used, and the use of a headset would be optional. The controller or interface could be hardwired or wireless. Optionally, a separate microphone and/or speaker in communication with the phone or other remote device could be used. The controller or interface may have a display, and/or other interfaces such as a microphone, speaker, etc.

In some aspects, the voice recognition software may be stored in the locator itself, or in a controller or interface device in communication with the headset, or stored remotely, for instance in a remote computer or server, or in the cloud. Communication between any major system components, e.g. the headset, pointer, locator, a remote controller or interface, etc., may be via a hardwire or wireless. In some embodiments, voice recognition software could may operate in a hybrid mode, partly running in the cloud, and partly running locally in one or more devices. Many wireless communication protocols could be used, including, but not limited to, WiFi, Bluetooth, NFC (Near-Field Communication), etc. In some embodiments, if communication links in the field were interrupted, voice messages can be recorded for later voice recognition processing. With sufficient bandwidth or storage, audio files can be stored, logged, and/or transmitted for quality checking.

In one aspect, the laser pointer is a visible laser pointer. The lasers would be configured to be both eye-safe and daylight visible. In some embodiments, a green laser could be used to provide a good balance between safety and daylight visibility. As an example, a green laser with 5 mW beam power would be safe, and be visible in full sunlight. Any visible color from red to blue could be used. Although in this context we are referring to a laser as a laser beam, in some embodiments any other narrow beam optically visual light beam could be used.

In one aspect, the laser pointer comprises a green laser operating at a wavelength of 520 nm. This wavelength would work well because it is in between the 555 nm center point of photopic vision (vision of the human eye under well-lit conditions), and 507 nm center point of scotopic vision (vision of the human eye under low light levels). In some aspects, a green laser of close to 550 nm would also work well if it had a high quantum efficiency. In another aspect, the laser pointer may have a 5% or better range accuracy in full sunlight.

In one aspect, a Bluetooth wireless headset configured with a microphone for receiving user voice input, and a single speaker or multiple speakers, e.g. stereo speakers, for outputting audio to a user would be provided. The microphone may be configured with noise-cancelling circuitry, to improve audio quality and increase safety. This would be especially useful in noisy outdoor environments, and/or environments with traffic and/or construction noise. The microphone may be a boom style microphone or other type of microphone that is well known in the art. The headset may include bone conduction technology (sound waves are transmitted through the bones of a user's skull instead of their ear canal). This allows the headset to be configured as an open-ear design, i.e. a configuration that does not block or cover a user's ears. This would offer more safety than a closed-ear design allowing more environmental sounds to be heard by a user. As an example, OPENCOMM Inc. provides such a bone conduction, stereo, Bluetooth headset configuration: https://shokz.com/products/opencomm?gclid=CjwKCAjwkMeUBhBuEi wA4hpqEJs49Pu52ow7miMz03R QB62221j4tU3P_Oa1A5CkWZHWo4TGOhhGNxoChToQ.AvD_BwE.

In one aspect, the location in space, i.e. in the world frame, of a laser pointer spot, dot, or pattern on a utility object being tagged, relative to the laser pointer and/or a utility locator, is calculated based upon a positioning system such as GPS, inertial systems, imaging systems, and many other types of positioning systems which are well known in the art.

In one aspect, the position of the laser point on the ground could be verbally annotated by the field operator. For instance, a user/field operator could talk into the microphone, and say "center of valve cover" or "southwest corner of storm drain gate."

In some aspects, determining the position of the laser spot on a utility object may be automated. For instance, an optical imaging system may be used to determine the location of the laser spot on an object identifiable by the imaging system. In some embodiments, the optical imaging system provided on a mobile phone or other remote device mounted on the locator could be used. As an example, if the laser spot is on a gas valve cover, and the valve cover is recognizable by the optical imaging system, then the location of the laser spot, and therefore, the gas valve cover, would be known. Furthermore, if the direction of the rays to each pixel of an imaging system is known, and you accurately know the position and orientation of the imaging system within the world frame, and you know the distances to specific pixels, you can determine where an individual pixel, or multiple pixels containing the laser spot, or a laser pattern lies in a 3D (three dimensional) world frame.

In one aspect, a user walks along a desired path taking utility measurements optionally using a Geo® Locator, also known as a GLR (Geo-Locator Receiver) or other type of utility locator or locator system. The user may use a cellular, mobile, or smart phone to operate the process of tagging a utility object. The user may keep the phone in a pocket or carrying pack of some kind, e.g. a backpack, fanny pack, etc., or attached to the locator in some manner, e.g. via a connector, coupling, dongle, and/or simply in some type of phone storing opening, e.g. a slot, compartment, etc., on the locator. The user may then simply tag items by speaking loudly enough for the phone microphone to pick up the audio. This volume will of course be determined by the type of phone used, the microphone settings, and the distance to the microphone from the user's mouth, and whether or not the microphone is covered or obstructed in some way, e.g. in a pocket or carrying pack, or in a locator slot or compartment. Any commands required for controlling items to be tagged, as well as subsequent tasks, e.g. keeping or rejecting a tagged utility object, mapping the item, annotating details about the object, storing the object, transmitting information about the tagged object, and any other control or processing commands could be performed completely verbally, manually using the phone keypad and/or touch screen, or a combination of both. Interfacing with the phone verbally could be accomplished with a custom voice recognition application, or using one or more well-known applications/software such as SIRI, ALEXA, or BIXBY.

In some aspects, one or more voice commands may be preprogrammed. As an example, a user might say "Hey SIRI," "tag start," or the like. Then a user could keep talking as desired, and say "tag stop" or other similar command to halt the process. This is of course only a single example, and one skilled in the art would appreciate that there are a huge number of commands that could be programmed depending on the application. Optionally, a user may initiate and/or control tagging of an object via a keypress integrated with the locating device.

In one aspect, a user may use a utility locator, e.g. a GLR. The user may be logging a session with a GLR that is not interacting or connected to the phone running an annotation or tagging application. Logging may include storing GPS utility position data via a user interface, e.g. a user pressing a button that time stamps the data. The phone which is running a voice recognition application (APP), may be located in the user's pocket. Then the user may tag a utility item by simply stating a word or words, e.g. "GAS", into the phone microphone. A comparison may be performed between the locator log and the phone APP, and the term GAS can then be associated with data from the log. In some embodiments, logging GPS utility positions using time stamps may include logging GPS utility positions using time stamps relative to locations that are carried out by various other utility locator devices other than the GLR as disclosed by SeeScan such as those publically available from Radiodetection Company, the Vivax-Metrotech Corporation, or the like.

In one aspect, motion detection may be used for tagging a utility object. As an example, utility locator may be placed in a stationary position by setting it on the ground or on an object, or by using a tripod or other type of stand. Once the locator motion sensors have determined that the locator has stopped moving, then processing software will automatically determine that the utility object at the location of the locator is to be tagged, and the next thing a user says would automatically be considered as an annotation for the utility object. For example, the user may set the locator down on a manhole cover directly or on a tri-pod or other stand, and then say "manhole cover", or use some other description of an object to be tagged. In another aspect, stopping the process of tagging a utility object could be triggered by sensing movement again when the user picks up the locator.

In one aspect, capturing of tagged utility object to be annotated may be triggered by a user speaking a special prompt word or phrase. For example, a user may start the process of tagging a utility object by stating "Hey Geo", "SeeScan", "SeeSnake", "SubView", etc.

In another aspect, ending an annotation may be triggered by using a special prompt word or phrase. In one example, words ending an annotation would be words that would be very specific words that would not normally be used to capture a tagged utility object. As an example, the word "STOP" may not be a good choice because if you were tagging items in a traffic intersection, you might want to tag a "Stop Sign" and using the word "stop" would automatically end the process.

In one aspect a display may be provided. The display may be integral with a cellular phone or other mobile device, or may be a stand-alone device. The display may be programmed to show in text any voice input received from a user. The display could also be integral with a pair of glasses that may include additional features such as AI (Artificial Intelligence), VR (Virtual Reality), or AG (Augmented Reality). The glasses could be a heads-up display, or part of a VR or AG head-set. Controls integral with the display including manual or voice controlled, or remote from the display, would give a user the ability to check input, and correct it if necessary. As an example, a user may say "CATV" for cable TV, however, the system may record it as "SEE A TV", and the user would be given the opportunity to change the utility tag to "Cable TV", there are of course many other examples that could be used.

In one aspect, a user may tag utility objects using voice annotation while viewing SubView® utility maps to allow for corrections, as well as additional annotations, i.e. additional description or location information, additional observations, or other relevant information. As an example, a user performing a locate operation finishes that locate, and goes back to their work vehicle to finish their paperwork. The user would then have access to real-time created maps (using the GLR), and also a scanned version of a previous given utility map, for example from a gas company. While using the same headset used for tagging utility objects via voice recognition, and running a SubView® app on their mobile device, e.g. a laptop in the truck, or on their phone, the user may view the scanned "as built" digital gas company maps, and they can associate what they located with any scanned legacy paper maps provided by the gas company. Then, they can click on a GLR mapped utility while looking at the gas company map that might say, e.g. "6 High Pressure, steel trunk line, 400 psi rated", and then they can just read the other map verbally into the GLR locate. They may then use a pinch or other zoom control, click the specific utility object on the SubView® map to annotate with the other maps more detailed data.

In one aspect, a user may tag utility objects using voice annotation by selecting multiple spots or areas around the object to denote a region with the laser. For example, the user may tag and verbally annotate "storm drain, corner one", "storm drain, corner two", "storm drain, corner three", and "storm drain, corner four". Any other number of points could be used to denote a region or object with the laser.

In one aspect, the process of tagging a utility asset or object may be automated using imaging recognition software to automatically tag objects (auto-tag). In one embodiment, an imaging element may be used to tag utility assets or objects and/or take pictures or videos of the object based on either user voice entered or manually entered input. For instance, a user may say or manually enter the words "manhole cover". As a user is performing a utility location operation, a camera integral with a GLR or other type of utility locator, or a remote camera such as one on a cellular phone or mobile phone, using imaging recognition software, will recognize any manhole cover in the cameras field of view, and automatically tag and/or take a picture of the object, depending on the input entered by the user. In some embodiments, upon image recognition of an object to be auto-tagged, the user may be prompted to add additional voice annotation to the auto-tag, and/or to accept or reject the auto-tag.

In one aspect, a locator or locator system, e.g. a GLR, with positioning capabilities, would be provided with approximately a decimeter or better accuracy level. The GLR may include an INS (Inertial Navigation System) for providing accurate poise or orientation, with approximately +/-2 degrees accuracy or better spherical, roll, pitch, and yaw to true world frame.

Various additional aspects, features, and functions are described below in conjunction with the Drawings.

Details of example devices, systems, and methods that may be used in or combined with the invention disclosed herein, are disclosed in co-assigned patents and patent applications including: U.S. Pat. No. 5,808,239, issued Aug. 17, 1999, entitled VIDEO PUSH-CABLE; U.S. Pat. No. 6,545,704, issued Jul. 7, 1999, entitled VIDEO PIPE INSPECTION DISTANCE MEASURING SYSTEM; U.S. Pat. No. 6,831,679, issued Dec. 14, 2004, entitled VIDEO CAMERA HEAD WITH THERMAL FEEDBACK LIGHTING CONTROL; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 6,862,945, issued Mar. 8, 2005, entitled CAMERA GUIDE FOR VIDEO PIPE INSPECTION SYSTEM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, m2011, entitled ADAPTIVE MULTICHANNEL LOCATOR SYSTEM FOR MULTIPLE PROXIMITY DETECTION; U.S. Pat. No. 7,969,151, issued Jun. 28, 2011, entitled PRE-AMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No.

8,289,385, issued Oct. 16, 2012, entitled PUSH-CABLE FOR PIPE INPECTION SYSTEM; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. Pat. No. 8,587,648, issued Nov. 19, 2013, entitled SELF-LEVELING CAMERA HEAD; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 8,841,912, issued Sep. 23, 2014, entitled PREAMPLIFIER AND MIXER CIRCUITRY FOR A LOCATOR ANTENNA; U.S. Pat. No. 8,908,027, issued Dec. 9, 2014, entitled ASYMMETRIC DRAG FORCE BEARING FOR USE WITH A PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. Pat. No. 8,984,698, issued Mar. 24, 2015, entitled LIGHT WEIGHT SEWER CABLE; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. Pat. No. 9,081,109, issued Jul. 14, 2015, entitled GROUND-TRACKING DEVICES FOR USE WITH A MAPPING LOCATOR; U.S. Pat. No. 9,080,992, issued Jul. 14, 2015, entitled ADJUSTABLE VARIABLE RESOLUTION INSPECTION SYSTEMS AND METHODS; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,222,809, issued Dec. 29, 2015, entitled PORTABLE PIPE INSPECTION SYSTEMS AND APPARATUS; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,521,303, issued Dec. 13, 2016, entitled CABLE STORAGE DRUM WITH MOVABLE CCU DOCKING APPARATUS; U.S. patent application Ser. No. 15/846,102, filed Dec. 16, 2016, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2017, entitled TRACKABLE DISTANCE MEASURING DEVICES, SYSTEMS, AND METHODS; U.S. Pat. No. 9,927,368, issued Mar. 27, 2021, entitled SELF-LEVELING INSPECTION SYSTEMS AND METHODS; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); United States Patent Application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; United States Patent Application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,769,366, issued Sep. 29, 2017, entitled SELF-GROUNDING TRANSMITTER PORTABLE CAMERA CONTROLLER FOR USE WITH PIPE INSPECTION SYSTEMS; U.S. Pat. No. 9,784,837, issued Oct. 10, 2017, entitled OPTICAL GROUND TRACKING APPARATUS, SYSTEMS & METHODS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND-TRACKING APPARATUS, SYSTEMS, AND METHODS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. patent application Ser. No. 16/255,524, filed Jan. 23, 2018, entitled RECHARGEABLE BATTERY PACK ONBOARD CHARGE STATE INDICATION METHODS AND APPARATUS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTIFREQUENCY LOCATING SYSTEMS AND METHODS; U.S. patent application Ser. No. 15/936,250, filed Mar. 26, 2018, entitled GROUND TRACKING APPARATUS, SYSTEMS, AND METHODS; U.S. Pat. No. 9,927,545, issued Mar. 27, 2018, entitled MULTIFREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 16/382,136, filed Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORHTOGONAL ANTENNAE; U.S. patent application Ser. No. 16/443,789, filed Jun. 18, 2018, entitled MULTI-DIELECTRIC COAXIAL PUSH-CABLES AND ASSOCIATED APPARATUS; U.S. Pat. No. 10,001,425, issued Jun. 19, 2018, entitled PORTABLE CAMERA CONTROLLER PLATFORM FOR USE WITH PIPE INSPECTION SYSTEM; U.S. Pat. No. 10,009,582, issued Jun. 26, 2018, entitled PIPE INSPECTION SYSTEM WITH REPLACEABLE CABLE STORAGE DRUM; U.S. patent application Ser. No. 16/036,713, issued Jul. 16, 2018, entitled UTILITY LOCATOR APPARATUS AND SYSTEMS; U.S. Pat. No. 10,027,526, issued Jul. 17, 2018, entitled METHOD AND APPARATUS FOR HIGH-SPEED DATA TRANSFER EMPLOYING SELF-SYNCHRONIZING QUADRATURE AMPLITUDE MODULATION; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498, issued Oct. 2, 2018, entitled MODULAR BATTERY PACK APPARATUS, SYSTEMS, AND METH- ODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. Pat. No. 10,100,507, issued Oct. 16, 2018, entitled PIPE CLEARING CABLES AND APPARATUS; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. patent application Ser. No. 16/810,788, filed Mar. 5, 2019, entitled MAGNETICALLY RETAINED DEVICE HANDLES; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. Pat. No. 10,288,997, issued May 14, 2019, entitled ROTATING CONTACT ASSEMBLIES FOR SELF-LEVELING CAMERA HEADS; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559 issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. Pat. No. 10,371,305, issued Aug. 6, 2019, entitled DOCKABLE TRIPODAL CAMERA CONTROL UNIT; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. patent application Ser. No. 16/559,576, filed Sep. 3, 2019, entitled VIDEO PIPE INSPECTION SYSTEMS WITH VIDEO INTEGRATED WITH ADDITIONAL SENSOR DATA; U.S. patent application Ser. No. 16/588,834, filed Sep. 30, 2019, entitled VIDEO INSPECTION SYSTEM WITH WIRELESS ENABLED CABLE STORAGE DRUM; United States Patent issued Oct. 8, 2019, entitled INSPECTION CAMERA DEVICES AND METHODS WITH SELECTIVELY ILLUMINATED MULTISENSOR IMAGING; U.S. patent application Ser. No. 16/676,292, filed Nov. 6, 2019, entitled ROBUST IMPEDANCE CONTROLLED SLIP RINGS; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,666,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 17/397,940, filed Aug. 9, 2021, entitled INSPECTION SYSTEM PUSH-CABLE GUIDE APPARATUS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTLITITY LOCATOR INCLUDING A CAMERA; U.S. Pat. Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. Pat. No. 10,764,541, issued Sep. 1, 2020, entitled COAXIAL VIDEO PUSH-CABLES FOR USE IN INSPECTION SYSTEMS; U.S. patent application Ser. No. 17/013,831, filed Sep. 7, 2020, entitled MULTIFUNCTION BURIED UTILITY LOCATING CLIPS; U.S. patent application Ser. No. 17/014,646, filed Sep. 8, 2020, entitled INTEGRATED FLEX-SHAFT CAMERA SYSTEM AND HAND CONTROL; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Pat. No. 10,809,408, issued Oct. 20, 2020, entitled DUAL SENSED LOCATING SYSTEMS AND METHODS; United States Patent issued Nov. 24, 2020, entitled PHASE-SYNCHRONIZED BURIED OBJECT TRANSMITTER AND LOCATOR METHODS AND APPARATUS; U.S. Pat. No. 10,845,497, issued Nov. 24, 2020, entitled HEAT EXTRACTION ARCHITECTURE FOR COMPACT VIDEO CAMERA HEADS; U.S. patent application Ser. No. 17/110,273, filed Dec. 2, 2020, entitled INTEGRAL DUAL CLEANER CAMERA DRUM SYSTEMS AND METHODS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; U.S. patent application Ser. No. 17/190,400, filed Mar. 3, 2021, entitled DOCKABLE CAMERA REEL AND CCU SYSTEM; U.S. Pat. No. 10,955,583, issued Mar. 23, 2021, entitled BORING INSPECTION SYSTEMS AND METHODS; U.S. Pat. No. 9,927,368, issued Mar. 27, 2021, entitled SELF-LEVELING INSPECTION SYSTEMS AND METHODS; U.S. Pat. No. 10,976,462, issued Apr. 13, 2021, entitled VIDEO INPECTION SYSTEMS WITH PERSONAL COMMUNICATION DEVICE USER INTERFACES; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. patent application Ser. No. 17/528,956, filed Nov. 17, 2021, entitled VIDEO INSPECTION SYSTEM, APPARATUS, AND METHODS WITH RELAY MODULES AND CONNECTION PORT; U.S. patent application Ser. No. 17/541,057, filed Dec. 2, 2021, entitled COLOR-INDEPENDENT MARKER DEVICE APPARATUS, METHODS, AND SYSTEMS; U.S. patent application Ser. No. 17/541,057, filed Dec. 2, 2021, entitled VIDEO INSPECTION SYSTEM, APPARATUS, AND METHODS WITH RELAY MODULES AND CONNECTION PORT-COLOR-INDEPENDENT MARKER DEVICE APPARATUS, METHODS, AND SYSTEMS; U.S. Pat. No. 11,193,767, issued Dec. 7, 2021, entitled SMART PAINT STICK DEVICES AND METHODS; U.S. Pat. No. 11,199,510, issued Dec. 14, 2021, entitled PIPE INSPECTION AND CLEANING APPARATUS AND SYSTEMS; U.S. Provisional Patent Application 63/293,828, filed Dec. 26, 2021, entitled MODULAR BATTERY SYSTEMS INCLUDING INTERCHANGEABLE BATTERY INTERFACE APPARATUS; U.S. Pat. No. 11,209,115, issued Dec. 28, 2021, entitled PIPE INSPECTION AND/OR MAPPING CAMERA HEADS, SYSTEMS, AND METHODS; U.S. patent application Ser. No. 17/563,049, filed Dec. 28, 2021, entitled SONDE DEVICES WITH A SECTIONAL FERRITE CORE; U.S. Provisional Patent Application 63/306,088, filed Feb. 2, 2022, entitled UTILITY LOCATING SYSTEMS AND METHODS WITH FILTER TUNING FOR POWER GRID FLUCTUATIONS; U.S. patent application Ser. No. 17/687,538, filed Mar. 4, 2022, entitled ANTENNAS, MULTI-ANTENNA APPARATUS, AND ANTENNA HOUSINGS; U.S. Pat. No. 11,280,934, issued Mar. 22, 2022, entitled ELECTROMAGNETIC MARKER DEVICES FOR BURIED OR HIDDEN USE; U.S. Pat. No. 11,300,597, issued Apr. 12, 2022, entitled SYSTEMS AND METHODS FOR LOCATING AND/OR MAPPING BURIED UTILITIES USING VEHICLE-MOUNTED LOCATING DEVICES; U.S. Pat. No. 11,333,786, issued May 17, 2022, entitled BURIED UTILITY MARKER DEVICE, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDER AND ASSOCIATED METHODS AND UTILITY LOCATOR DEVICES; U.S. Pat. No. 11,366,245, issued Jun. 21, 2022, entitled BURIED UTILITY LOCATOR GROUND TRACKING APPARATUS, SYSTEMS, AND METHODS; U.S. Provisional Patent Application 63/368,879, filed Jul. 19, 2022, entitled NATURAL VOICE UTILITY ASSET ANNOTATION SYSTEM; U.S. Pat. No. 11,397,274, issued Jul. 26, 2022, entitled TRACKED DISTANCE MEASURING DEVICES, SYSTEMS, AND METHODS; U.S. patent application Ser. No. 17/815,387, filed Jul. 27, 2022, entitled INWARD SLOPED DRUM FACE FOR PIPE INSPECTION CAMERA SYSTEM; U.S. Pat. No. 11,404,837, issued Aug. 2, 2022, entitled ROBUST IMPEDANCE CONTROLLED SLIP RINGS; U.S. Pat. No. 11,402,237, issued Aug. 2, 2022, entitled VIDEO PIPE INSPECTION SYSTEMS WITH VIDEO INTEGRATED WITH ADDITIONAL SENSOR DATA; U.S. Provisional Patent Application 63/370,760, filed Aug. 8, 2022, entitled SYSTEMS AND METHODS FOR INSPECTION ANIMATION; U.S. Pat. No. 11,418,761, issued Aug. 16, 2022, entitled INSPECTION CAMERA DEVICES AND METHODS WITH SELECTIVELY ILLUMINATED MULTISENSOR IMAGING SYSTEMS; U.S. Pat. No. 11,428,814, issued Aug. 30, 2022, entitled OPTICAL GROUND TRACKING APPARATUS, SYSTEMS, AND METHODS FOR USE WITH BURIED UTILITY LOCATORS; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; U.S. Pat. No. 11,448,600, issued Sep. 20, 2022, entitled MULTI-CAMERA PIPE INSPECTION APPARATUS, SYSTEMS, AND METHODS; U.S. patent application Ser. No. 17/935,564, filed Sep. 26, 2022, entitled SYSTEMS AND METHODS FOR DETERMINING AND DISTINGUISHING BURIED OBJECT USING ARTIFICIAL INTELLIGENCE; U.S. Pat. No. 11,460,598, issued Oct. 4, 2022, entitled USER INTERFACES FOR UTILITY LOCATORS; U.S. Pat. No. 11,467,317, issued Oct. 11, 2022, entitled ELECTROMAGNETIC MARKER DEVICES WITH SEPARATE RECEIVE AND TRANSMIT ANTENNA ELEMENTS; U.S. Pat. No. 11,468,610, issued Oct. 11, 2022, entitled METHODS AND SYSTEMS FOR GENERATING INTERACTIVE MAPPING DISPLAYS IN CONJUNCTION WITH USER INTERFACE DEVICES; U.S. Pat. No. 11,476,539, issued Oct. 18, 2022, entitled MODULAR BATTERY PACK APPARATUS, SYSTEMS, AND METHODS INCLUDING VIRAL DATA AND/OR CODE TRANSFER; U.S. Pat. No. 11,474,276, issued Oct. 18, 2022, entitled SYSTEMS AND METHODS FOR UTILITY LOCATING IN A MULTI-UTILITY ENVIRONMENT; U.S. Pat. No. 11,476,851, issued Oct. 18, 2022, entitled MAGNETICALLY SENSED USER INTERFACE DEVICES; U.S. Provisional Patent Application 63/380,375, filed Oct. 20, 2022, entitled LINKED CABLE-HANDLING AND CABLE-STORAGE DRUM DEVICES AND SYSTEMS FOR THE COORDINATED MOVEMENT OF A PUSH-CABLE; U.S. Provisional Patent Application 63/435,148, filed Dec. 23, 2022, entitled SYSTEMS, APPARATUS, AND METHODS FOR DOCUMENTING UTILITY POTHOLES AND ASSOCIATED UTILITY LINES; U.S. patent application Ser. No. 18/089,266, filed Dec. 27, 2022, entitled MODULAR BATTERY SYSTEMS INCLUDING INTERCHANGEABLE BATTERY INTERFACE APPARATUS; U.S. patent application Ser. No. 18/162,663, filed Jan. 31, 2023, entitled UTILITY LOCATING SYSTEMS AND METHODS WITH FILTER TUNING FOR POWER GRID FLUCTUATIONS; United States Provisional Patent Application 63/485,905, filed Feb. 18, 2023, entitled SYSTEMS AND METHODS FOR INSPECTION ANIMATION; U.S. Provisional Patent Application 63/492,473, filed Mar. 27, 2023, entitled VIDEO INSPECTION AND CAMERA HEAD TRACKING SYSTEMS AND METHODS; U.S. Pat. No. 11,614,613, issued Mar. 28, 2023, entitled DOCKABLE CAMERA REEL AND CCU SYSTEM; U.S. Pat. No. 11,649,917, issued May 16, 2023, entitled INTEGRATED FLEX-SHAFT CAMERA SYSTEM WITH HAND CONTROL; U.S. Pat. No. 11,665,321, issued May 30, 2023, entitled PIPE INSPECTION SYSTEM WITH REPLACEABLE CABLE STORAGE DRUM; U.S. Pat. No. 11,674,906, issued Jun. 13, 2023, entitled SELF-LEVELING INSPECTION SYSTEMS AND METHODS; and United U.S. Provisional Patent Application 63/514,090, filed Jul. 17, 2023, entitled SMARTPHONE MOUNTING APPARATUS FOR ASSET TAGGING AS USED WITH UTILITY LOCATOR DEVICES. The content of each of the above-described patents and applications is incorporated by reference herein in its entirety. The above applications may be collectively denoted herein as the "co-assigned applications" or "incorporated applications."

BRIEF DESCRIPTION OF THE DRAWINGS

FIG. 12 is an illustration of an embodiment illustrates details of an exemplary method 1200 for using voice editing to correct text related to a tagged utility asset or object.

DETAILED DESCRIPTION OF EMBODIMENTS

It is noted that as used herein, the term "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

Figure 1:
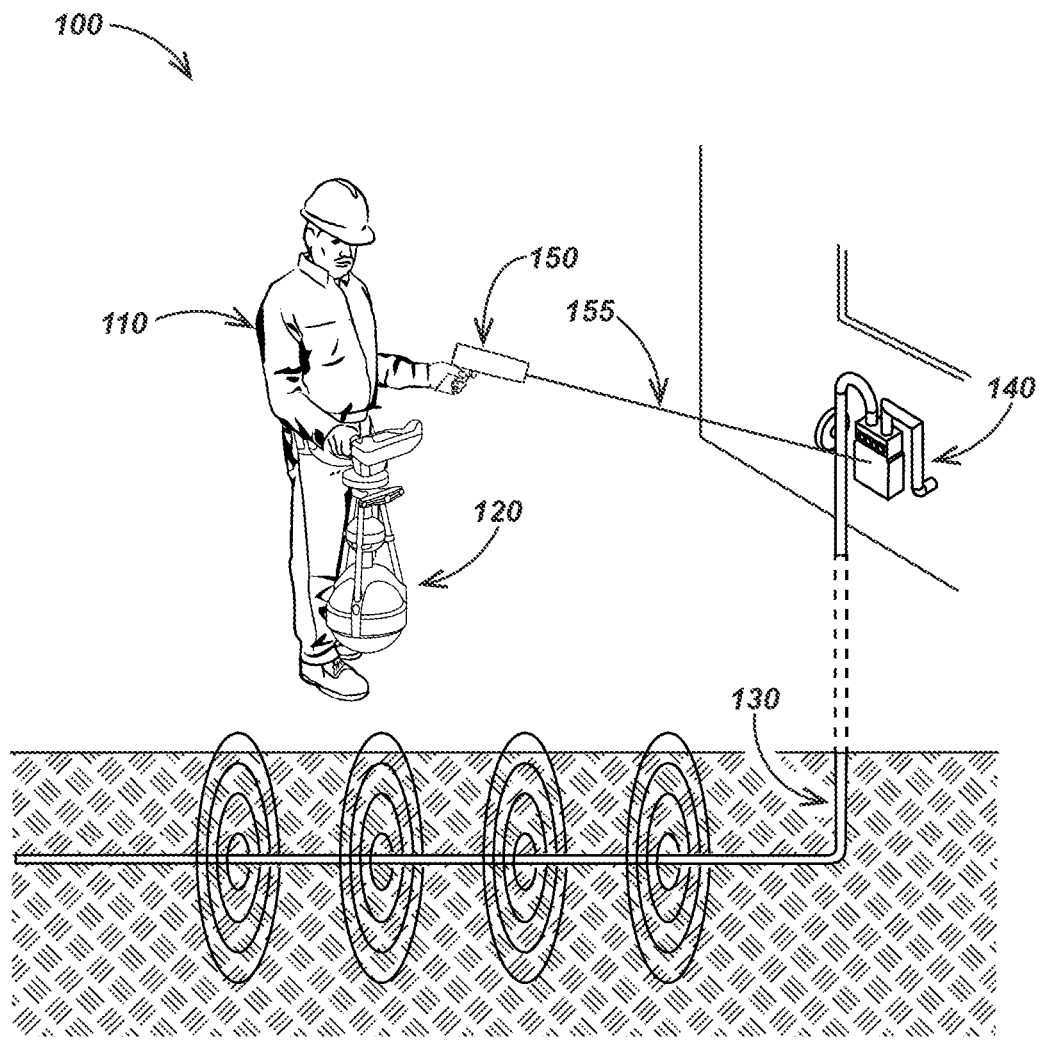
FIG. 1 is an illustration of an embodiment of a system for collecting multifrequency electromagnetic utility data, as known in the prior art.

FIG. 1 illustrates details of an exemplary prior art embodiment of a Geo-Locator Receiver System (GLR) 100 for collecting multifrequency electromagnetic data from buried objects associated with utilities. Note that other range finding means such as lidar, radar, optical, acoustical, etc. are well known in the art, and could also be used. Additionally, laser pointers and range finders (not shown) could be used in traditional location operations. A utility service worker or other user 110 is shown collecting data with a GLR 120 that is related to an underground utility, e.g. an electrical, gas, or water line 130. The underground utility 130 is shown connected to a utility asset 140. In this case, a utility asset 140 may appears to be a gas meter, junction box, connecting or routing terminal etc. However, utility asset 140 may be any utility object, as previously described. A laser pointer and/or laser range finder 150 is being used as part of a location operation by aiming laser beam 155 at utility asset 140. GLR 110 may include one or more of the following: GPS or other satellite systems, utility or other locator systems, equipment with one or more transmitters, receivers, or transceivers, SONDE equipment, and many other types of utility sensing equipment well known by those skilled in the art.

Figure 2A:
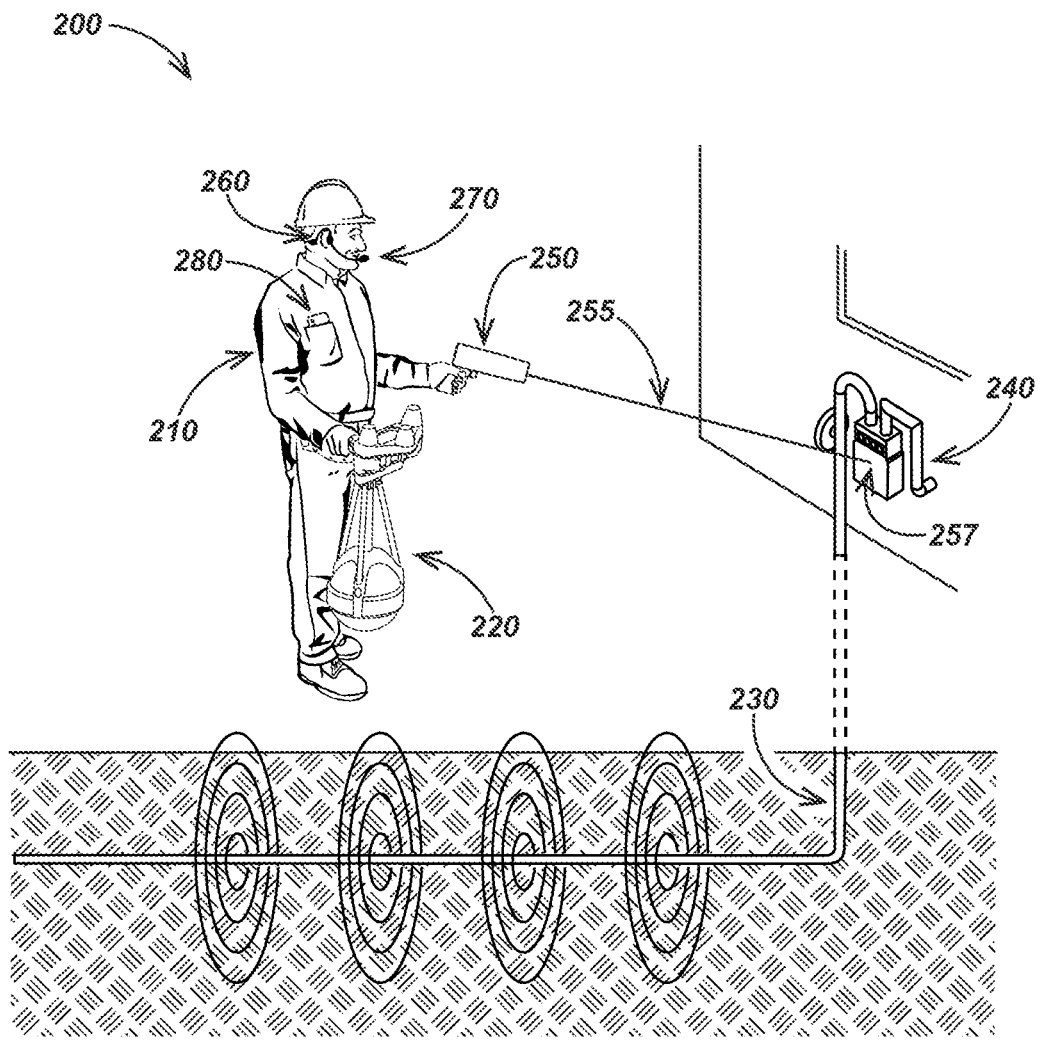
FIG. 2A is an illustration of an embodiment of a system for tagging identified utility assets or objects related to underground utilities, in accordance with certain aspects of the present invention.

FIG. 2A illustrates details of an exemplary system 200 for tagging identified utility assets or objects related to underground utilities. A utility service worker or other user 210 is shown collecting data with a GLR 220 that is related to an underground utility, e.g. an electrical, gas, or water line 230. The underground utility 230 is shown connected to a utility asset or object 240. The user 210 is shown holding a laser pointer or range finder 250. The user 210 may tag utility asset 240 by aiming laser beam 255 at the utility asset 240 by placing laser point 257 on utility asset or object 240, using a trigger or other laser pointer activation control (not shown), speaking into a headset 260 which includes a boom microphone 270, and naming (annotating) the utility asset or object 240. In some embodiments, headset 260 would be optional as a mobile device 280 such as a cellular phone or mobile phone could be used to provide a microphone and/or speaker. A voice recognition application running on a mobile device 280, and/or GLR 220 and/or other computing device will interpret the speech used to name utility asset or object 240, and repeat it back to user 210 via an audio output device in headset 260. The user 210 may then accept or reject the tagged object by speaking an audio command into boom microphone 270. The position of the tagged laser spot may be determined using the GLR position and orientation, and the range measured from,m the laser point to the laser pointer or range finder. One or more processors (not shown) may be integral with one or more of headset 260, laser pointer 250, mobile device 280, or GLR 220.

If a mobile device 280 is used instead of a headset 260, the mobile device 280 should be oriented in a position to optimize the use of the microphone incorporated in or with the mobile device 280.

Figure 2B:
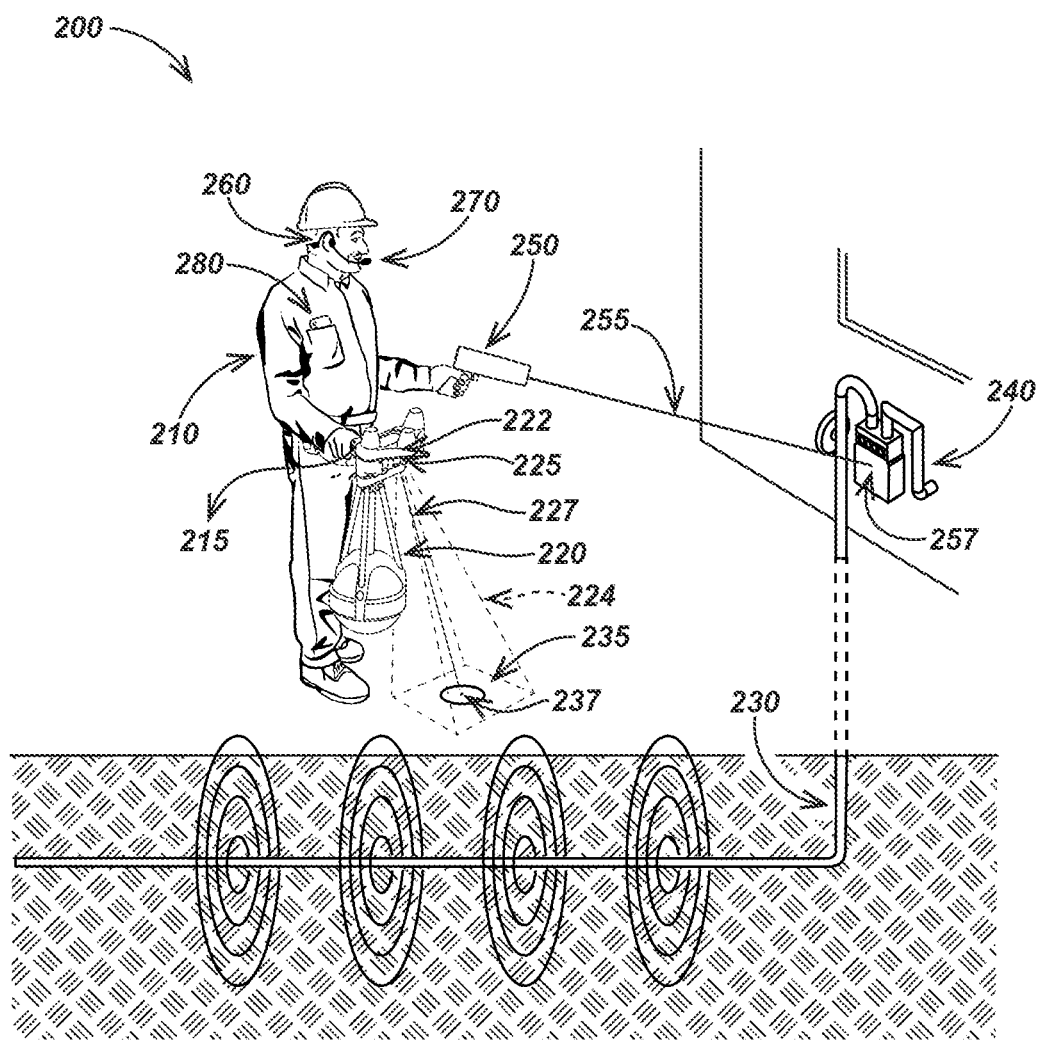
FIG. 2B is an illustration of an alternative embodiment of a system for tagging identified utility assets or objects related to underground utilities, in accordance with certain aspects of the present invention.

FIG. 2B illustrates details of an exemplary system 200 for tagging identified utility assets or objects related to underground utilities. A utility service worker or other user 210 is shown collecting data with a GLR 220 that is related to an underground utility, e.g. an electrical, gas, or water line 230. The underground utility 230 is shown connected to a utility asset or object 240. The user 210 is shown holding a laser pointer or range finder 250. The user 210 may tag utility asset 240 by aiming laser beam 255 at the utility asset 240 by placing laser point 257 on utility asset or object 240, using a trigger or other laser pointer activation control (not shown), speaking into a headset 260 which includes a boom microphone 270, and naming (annotating) the utility asset or object 240. A voice recognition application running on a mobile phone 280, and/or the GLR 220 and/or other computing device will interpret the speech used to name utility asset or object 240, and repeat it back to user 210 via an audio output device in headset 260. The user 210 may then accept or reject the tagged object by speaking an audio command into boom microphone 270. One or more processors (not shown) may be integral with one or more of headset 260, laser pointer 250, mobile device 280, or GLR 220. A laser pointer or range finder 225, integrated with the GLR 220 may be provided to measure the distance from the GLR 220 to a ground utility object 235, or tag ground utility object 235 by aiming laser beam 227 at utility object 235 by placing laser point 237 on utility object 235. If utility object 237 is magnetically detected, user 210 may be prompted to add an audio annotation or tag. In some embodiments, GLR 220 may include a dual laser pointer. (not shown).

Figure 3A:
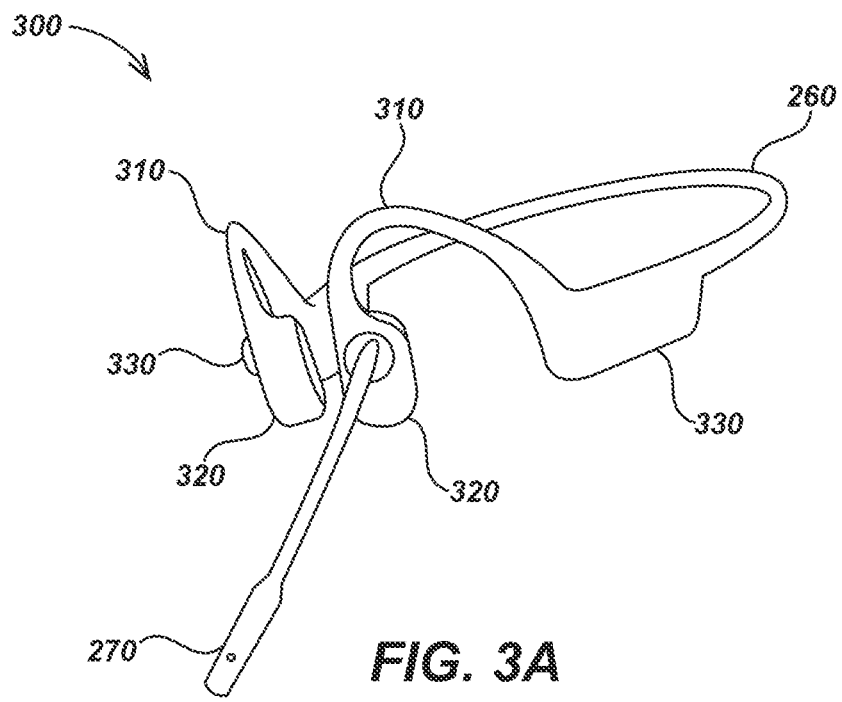
FIGS. 3A and 3B are illustrations of an embodiment of a wireless headset system for naming or annotating a tagged utility asset or object, in accordance with certain aspects of the present invention.
Figure 3B:
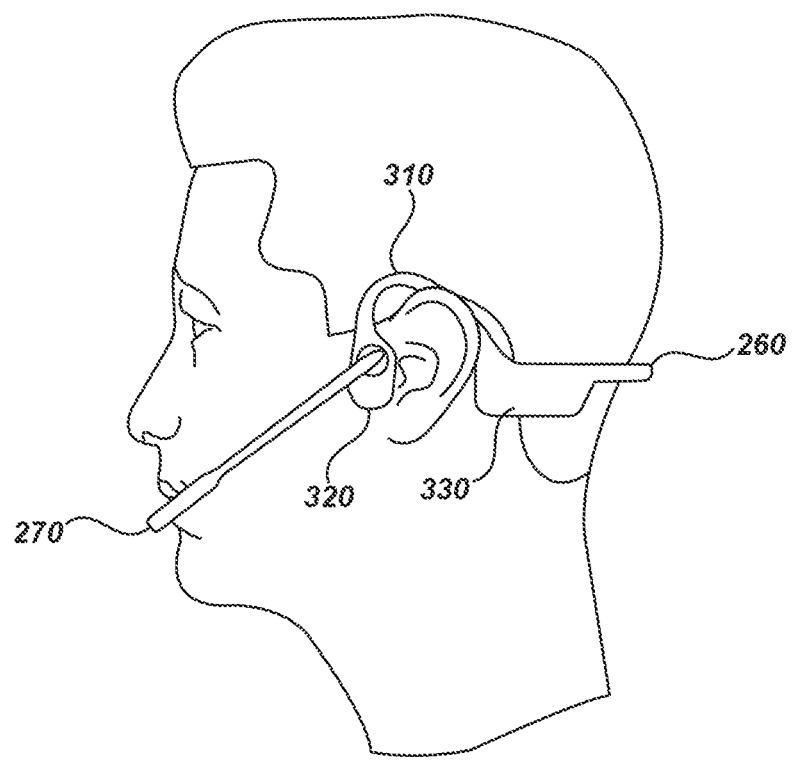

FIGS. 3A and 3B illustrate details of an exemplary embodiment 300 of a wireless headset system for naming or annotating a tagged utility asset or object. Wireless headset system 300 includes the headset 260 with the boom microphone 270 which may include noise cancellation circuitry, or alternatively software algorithms to filter noise stored in one more memories located remotely, e.g. in mobile device 280, or in GLR 220. Earpieces 310, as well as ear securing pads 320 are provided for securing headset 260 around a service worker or user's ears, as shown in FIG. 3B. Wireless headset system 300 includes an audio output element which may be a speaker or other audio output element. As illustrated, a bone conduction audio output element 330 is provided though in other embodiments other types of audio output elements may be included.

Figure 4:
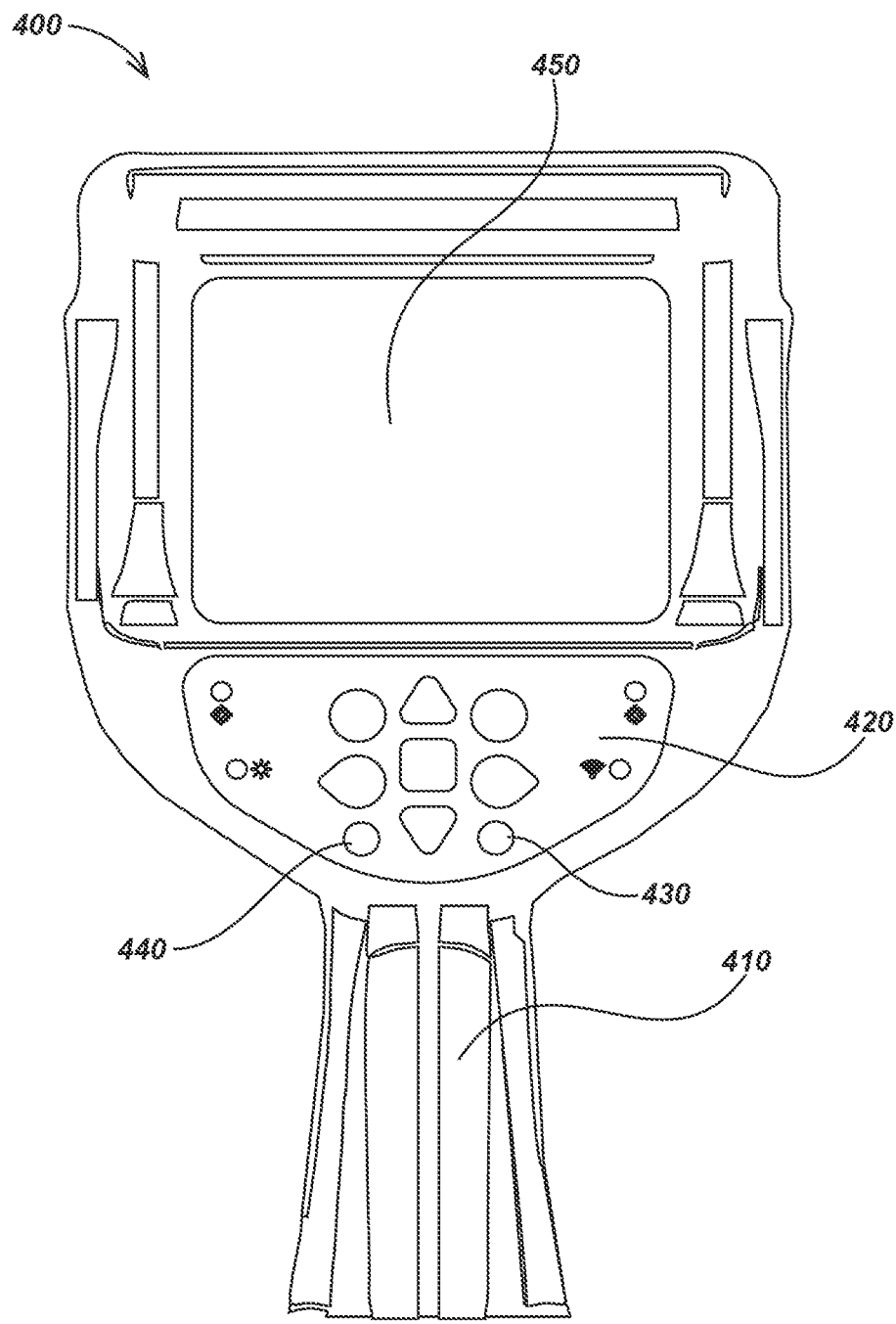
FIG. 4 is an illustration of an embodiment of a GLR user interface, in accordance with certain aspects of the present invention.

FIG. 4 illustrates details of an exemplary GLR user interface 400. The GLR user interface 400 may include a handle 410, a keypad 420 including a tag key 430 and a mapping key 440, and a display 450. In addition, the GLR may include programming stored in memory for correlating GLR collected data with a tagged utility asset or object based on input entered by a user on keypad 420. One or more processors (not shown) may be integral GLR user interface 400. Although a specific key layout is shown, it would be understood by those skilled in the art that the keypad 420, as well as the functionality for each key could be reconfigured, as desired, to best suit a specific application.

Figure 5:
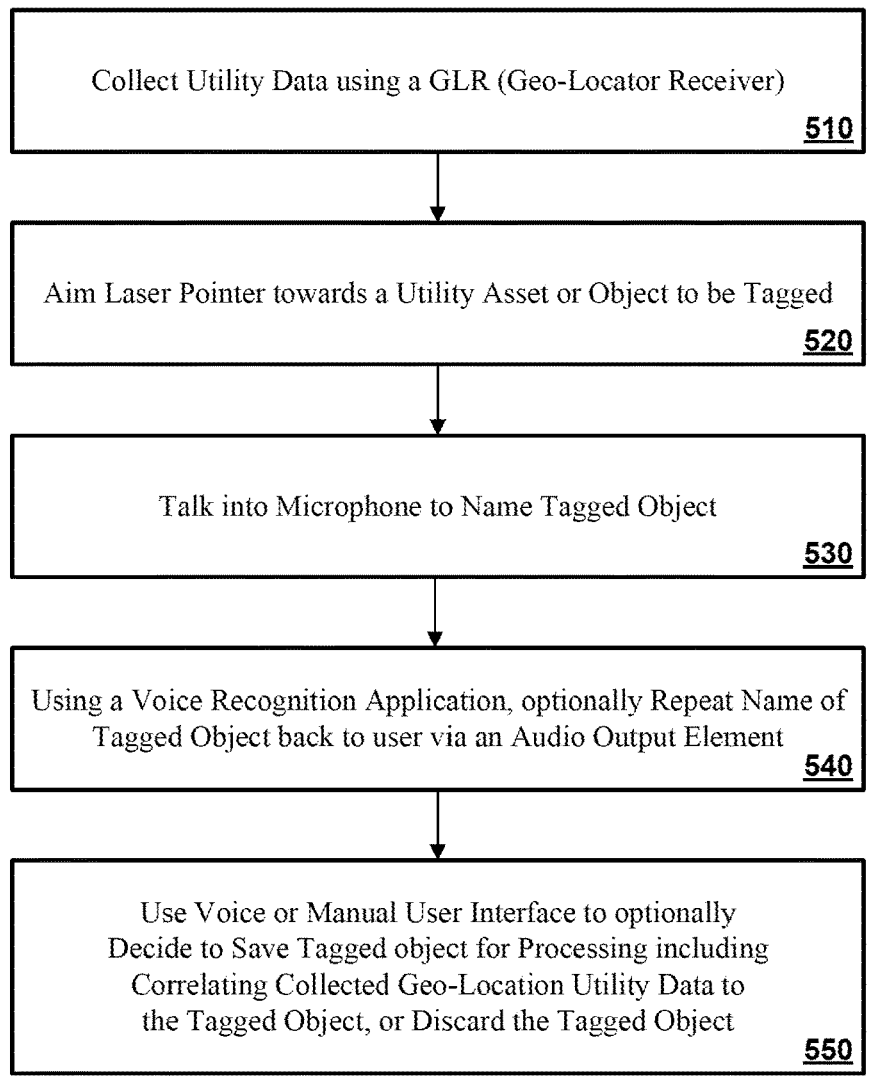
FIG. 5 is an illustration of an embodiment of a method of tagging visually identifiable objects using natural language in a utility locating system, in accordance with certain aspects of the present invention.

FIG. 5 illustrates details of an exemplary method 500 of tagging visually identifiable objects using natural language in a utility locating system. The method starts at block 510 collecting utility data using a GLR (Geo-Locator Receiver) and proceeds to block 520 where a laser pointer is aimed towards a utility asset or object to be tagged. In some embodiments, steps 510 and 520 may occur concurrently. The method then proceeds to block 530 where a utility service worker or other user talks into a microphone to annotate/name the tagged object. In block 540, a voice recognition application is optionally used to repeat the name of the tagged object back to a user via an audio output element. Finally, the method proceeds to block 550 where the user uses a voice or manual user interface to optionally decide to save the tagged object for processing including correlating collected Geo-Location Utility Data to the tagged object, or chooses instead to discard the tagged object. In some embodiments, the voice interface may include a voice command comprising a key word.

Figure 6:
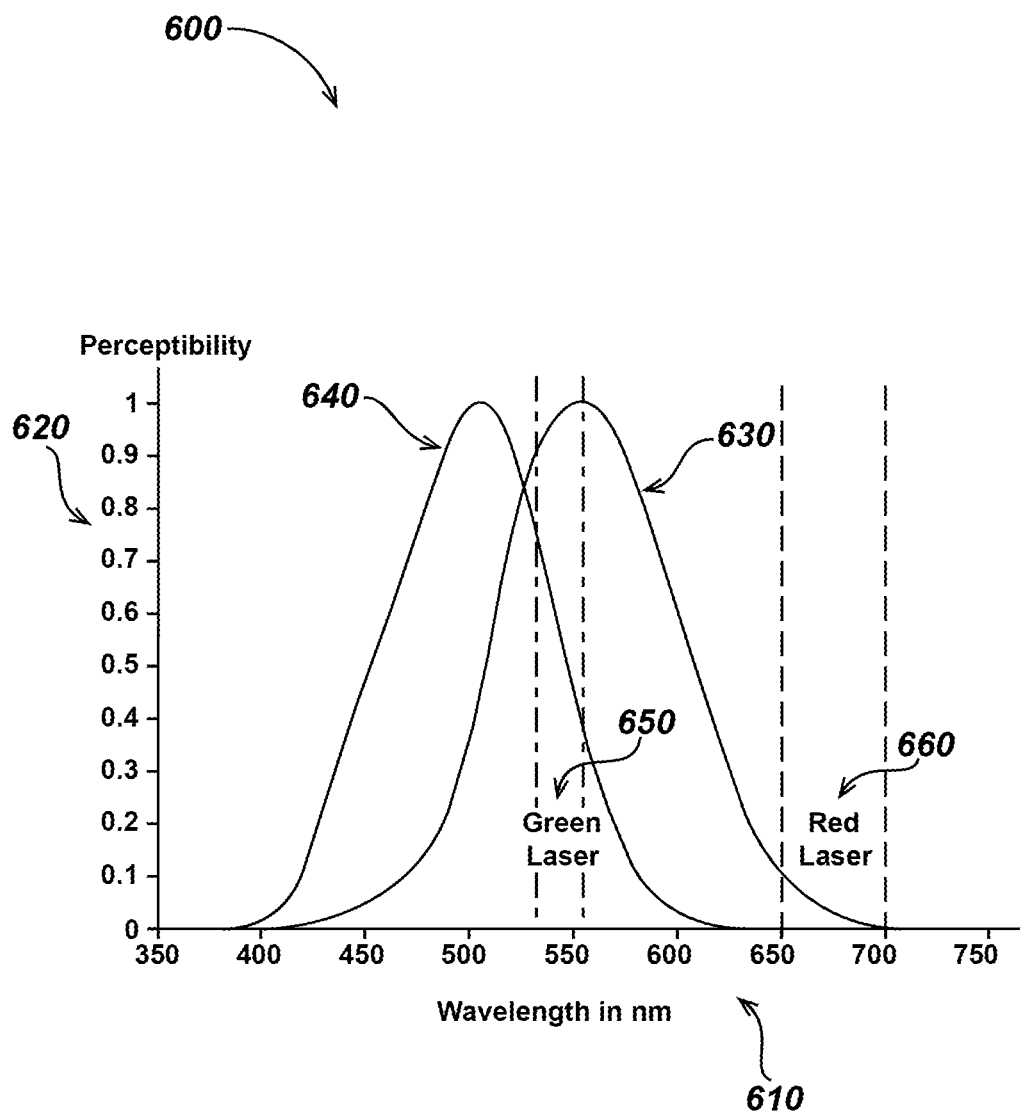
FIG. 6 is a diagram demonstrating wavelengths perceptible in photopic lighting conditions as understood via the luminous efficiency function relative to different laser color wavelengths, in accordance with certain aspects of the present invention.

FIG. 6 illustrates a diagram 600 demonstrating the luminous efficiency function describing the average spectral sensitivity of human visual perception of brightness or, in other words, the relative sensitivity to light a different wavelengths. The x-axis 610 represents visual perceptibility of the human eye, while the y-axis 620 represents wavelength measured in nm. Diagram 600 graphs the average perception at photopic lighting conditions 630, which may be brightly lit conditions (day light or the like), as well as scotopic lighting conditions 640, which may be low lighting conditions. It should be understood that "daylight visible" may fall in the visible light spectrum (380 to 700 nm) and be readily detectable at photopic lighting conditions 630. As shown, a green laser spectrum 650, ranging in the 532 to 555 nm wavelengths, may be readily detectable at photopic lighting conditions 630. Likewise, the green laser spectrum 650 may be readily perceived by the human eye during scotopic lighting conditions 640. This green laser spectrum 650 may be in contrast to red lasers that are commonly used in known rangefinders. For instance, a red laser spectrum 660 ranging in the 650 to 700 nm wavelengths, falls outside the photopic lighting conditions 630 and may be substantially difficult to perceive by the human eye even at scotopic lighting conditions 640.

Figure 7:
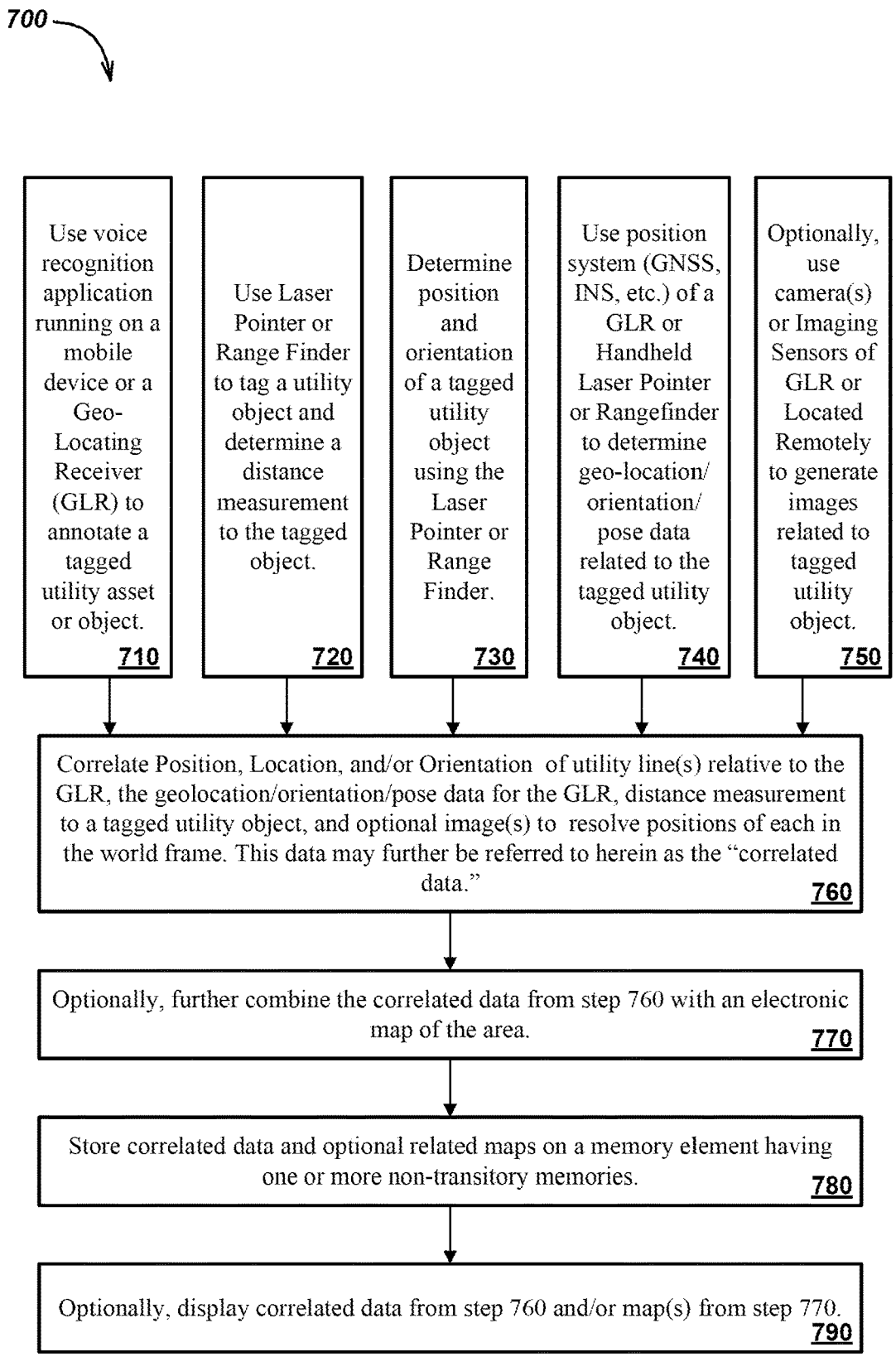
FIG. 7 is an illustration of an embodiment of a method of using natural voice for tagging or annotating utility assets or objects, in accordance with certain aspects of the present invention.

FIG. 7 illustrates details of an exemplary method 700 of using natural voice for tagging or annotating utility assets or objects. The method starts at block 710 where a voice recognition application running on a mobile device or on a Geo-Location Receiver is used to annotate a tagged utility asset or object. In block 720 a handheld or GLR integrated laser pointer or range finder is used to tag a utility object and determine a distance measurement to, and position of the tagged object. In block 730 the position and orientation of a tagged utility object is determined using the laser pointer or range finder. The position is determined in the world frame of the laser point on the tagged utility object. In block 740 a position system (GNSS, INS, etc.) of a GLR is used to determine geo-location, orientation, and pose data related to the tagged utility object. Optionally, in block 750 one or more cameras or imaging sensors located in the GLR or remotely, may be used to generate images related to a tagged utility object. In block 760 the position, location and/or orientation of utility line(s) relative to the GLR, geolocation, orientation, and pose data for the GLR, a distance measurement to a tagged utility object, and optional image(s) are correlated to resolve positions of each in the world frame. This data may further be referred to herein as correlated data. Next, optionally in block 770 the correlated data from step 760 may be combined with an electronic map of the area. In block 780 correlated data and optional related maps may be stored on a memory element having one or more non-transitory memories. Optionally, in block 790 correlated data from step 760 and/or one or more maps from block 770 may be rendered on a display for viewing by a user.

Figure 8A:
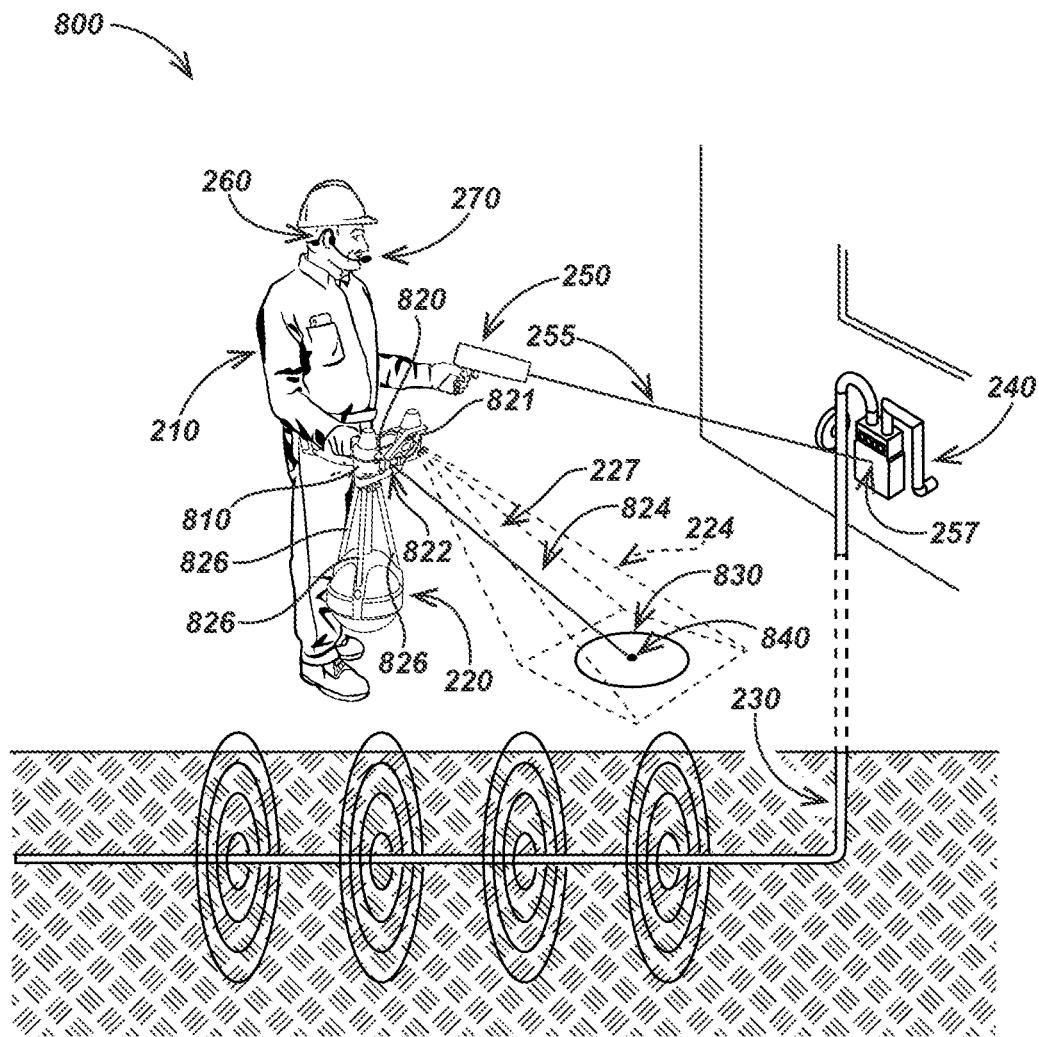
FIGS. 8A-8E are illustrations of an embodiments of a system for tagging identified utility assets or objects related to underground utilities, in accordance with certain aspects of the present invention.

FIG. 8A illustrates details of an exemplary system 800 for tagging identified utility assets or objects related to underground utilities. A utility service worker or other user 210 is shown collecting data with a GLR 220 that is related to an underground utility, e.g. an electrical, gas, or water line 230. GLR 220 is only given as an example. It would be understood by one of ordinary skill in the art that GLR 220 could have been different configurations including different shapes and profiles, various antenna, sensor, electronic, and interface configurations, and various functionality, hardware, and software configurations. The underground utility 230 is shown connected to a utility asset or object 240. The user 210 is shown holding a laser pointer or range finder 250. The user 210 may tag utility asset 240 by aiming laser beam 255 at the utility asset 240 by placing laser point 257 on utility asset or object 240, using a trigger or other laser pointer activation control (not shown), speaking into a headset 260 which includes a boom microphone 270, and naming (annotating) the utility asset or object 240. A voice recognition application running on a mobile phone (or other mobile device) 810, and/or the GLR 220 and/or other computing device and attached to GLR 220 via a mounting device 820 which is attached to a phone holder 821 will interpret the speech used to name utility asset or object 240, and optionally repeat it back to user 210 via an audio output device in headset 260. The user 210 may then optionally accept or reject the tagged object by speaking an audio command into boom microphone 270. A laser pointer or range finder 822, integrated with the GLR 220 may be provided to measure the distance from the GLR 220 to a ground utility object 830, or tag ground utility object 830 by aiming laser beam 824 at utility object 830 which may be a manhole cover valve cover, etc., by placing laser point 840 on utility object 830. GLR 220 may include one or more retractable legs 826 which can be stored as shown, or can be positioned to allow GLR 220 to be self-standing (see FIGS. 8B-8E). Mobile phone 810 may include an imaging system, e.g. a camera, which could be used for taking photos, and/or videos.

In some embodiments, GLR 220 may include a dual laser (not shown). One or more processors (not shown) may be integral with one or more of headset 260, laser pointer 250, mobile device 810, or GLR 220. A ground object 830 that has been previously tagged may now have an audio tag associated with it which may be listened to by a user via audio output elements (not shown) integral with headset 260. Audio associated with a tagged object may be listened to in real-time, i.e. as GLR 220 approaches the tagged object. Alternatively, audio associated with a previously tagged object that has already been stored in one or more memories either local to GLR 220 or remotely, or stored in the cloud, may be retrieved at a later time, as desired.

Figure 8B:
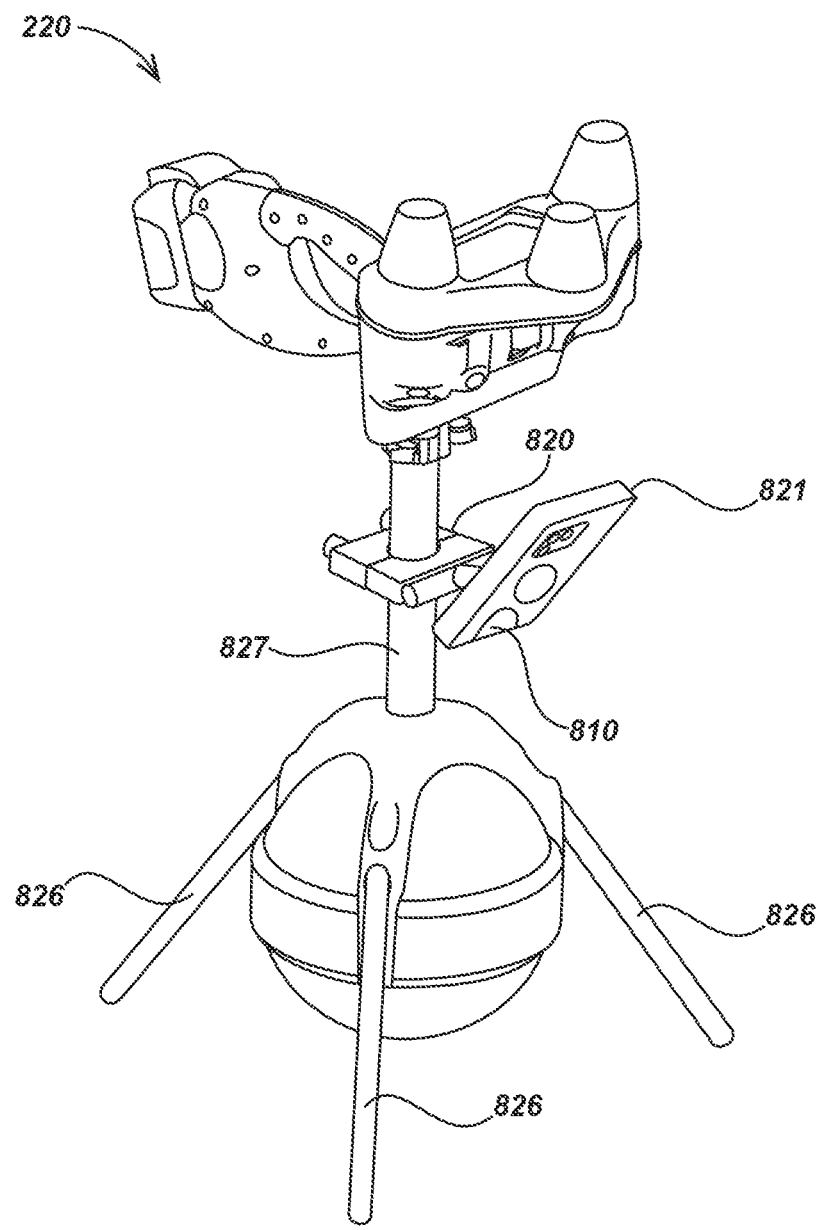

FIG. 8B illustrates details of an embodiment of a GLR 220 which may be used in exemplary system 800 (see FIG. 8A) for tagging identified utility assets or objects related to underground utilities. Retractable legs 826 are shown in an un-stored position which allows GLR 220 to be self-standing, if needed. In this embodiment, mounting device 820 is shown attached to the mast 827 of GLR 220. Mounting device 820 is exemplary only, as many other configurations of shapes, sizes, attachments, etc. may be used, depending on the application. Phone holder 821 is shown with phone (aka mobile device) 810 inserted, and positioned in a relatively upright position, and positioned at relative forward angle away from GLR 220. The positioning and angle of phone holder 821, and therefore, phone 810, can be optimized for different applications. For instance, it may be desirable to position phone 810 towards the ground, or towards a specific object if a sensor in phone 810, e.g. camera, radar, lidar, etc. is being used, or it may be desirable to point the phone up towards a user to better capture spoken audio, and/or view the phone display.

Figure 8C:
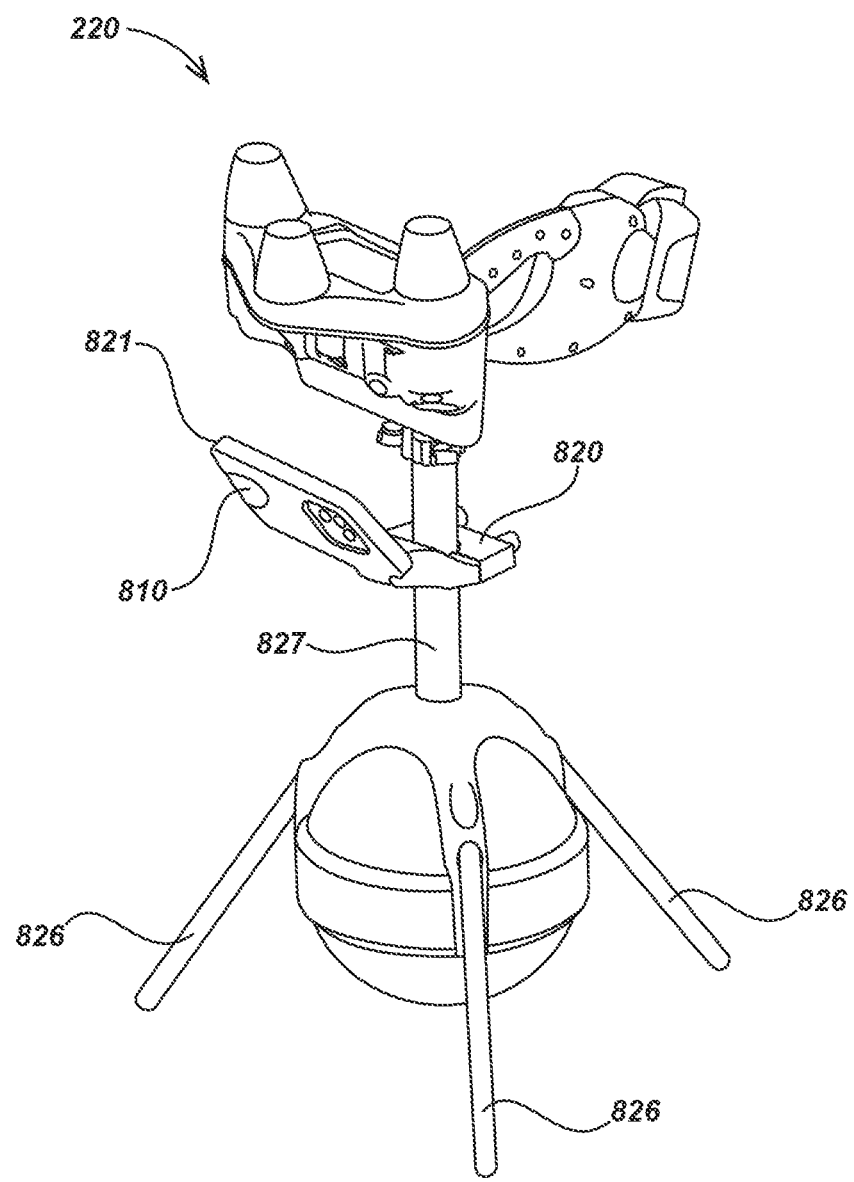

FIG. 8C illustrates the same details as FIG. 8B, from a slightly different view. In this embodiment, phone holder 821 is shown with phone (aka mobile device) 810 inserted, and positioned in a relatively sideways position, and positioned at relative forward angle away from GLR 220.

Figure 8D:
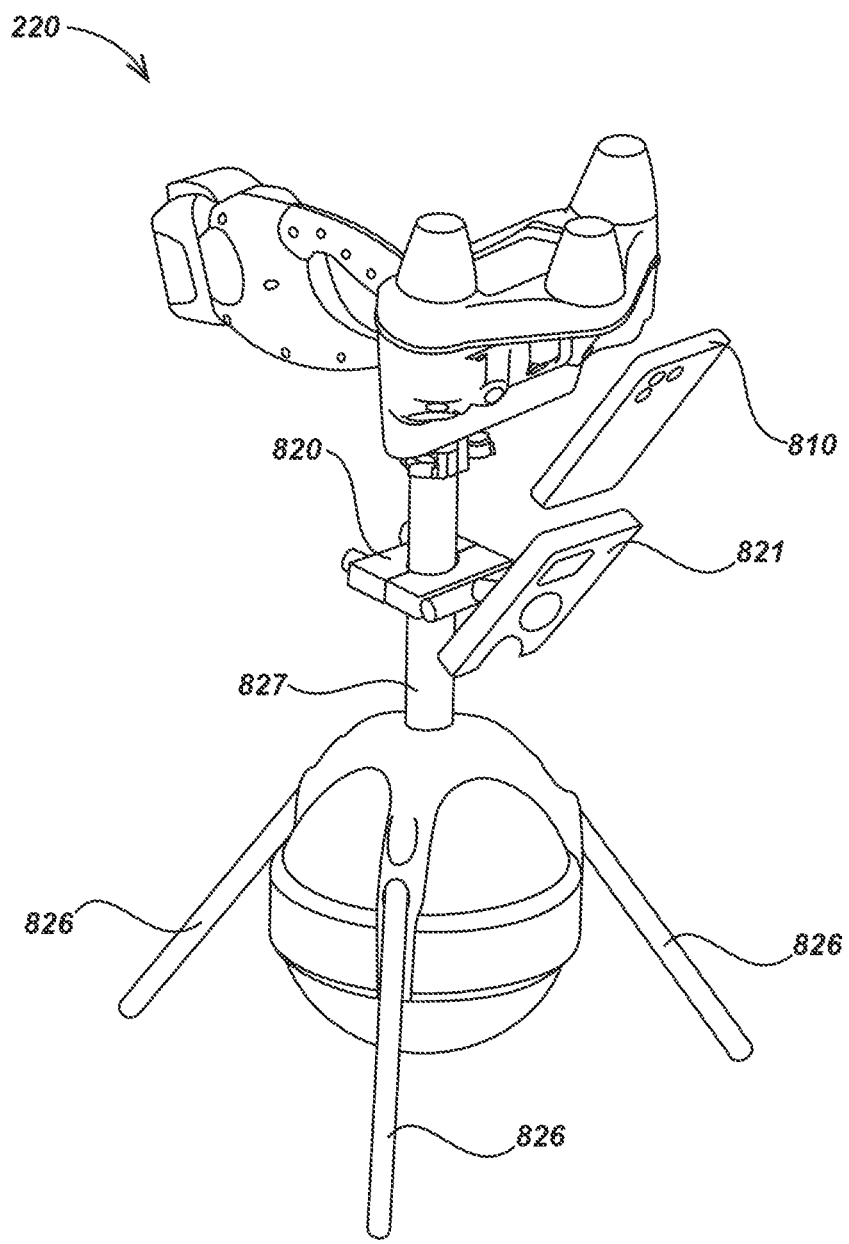

FIG. 8D illustrates shows the same details as FIG. 8B. In this view phone 821 is shown removed from phone holder 821.

Figure 8E:
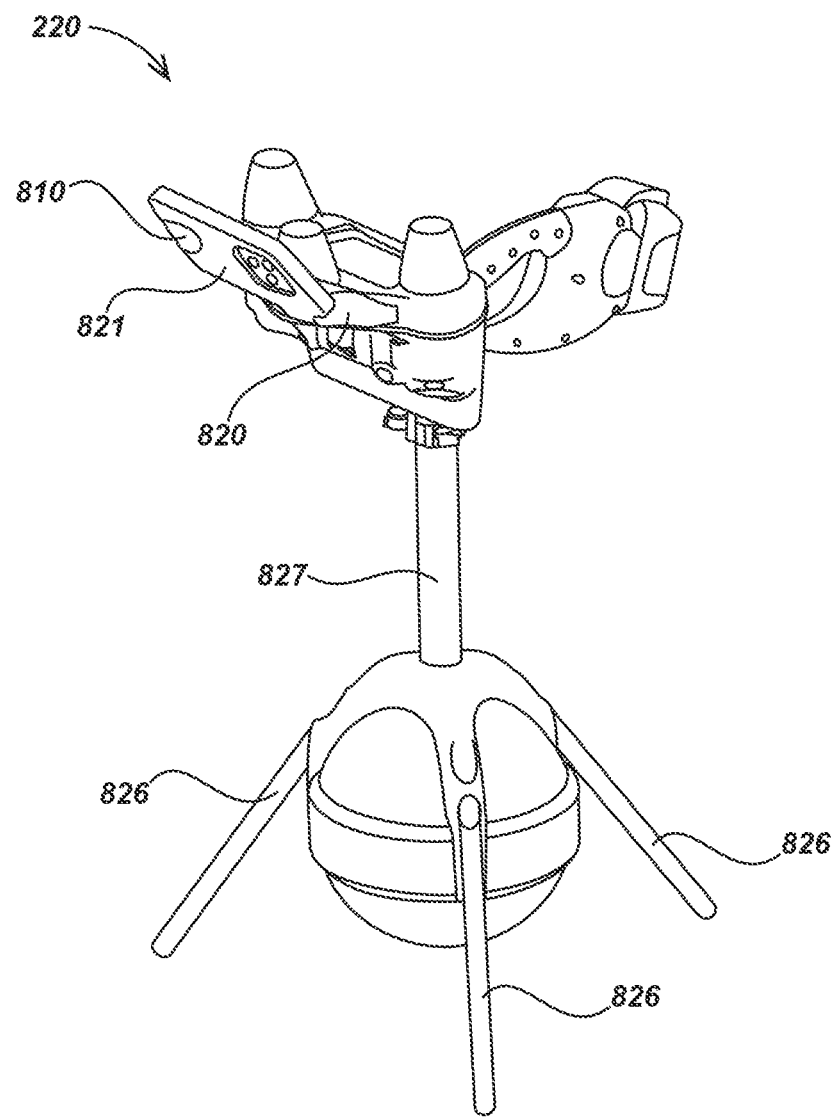

FIG. 8E illustrates details of an embodiment of a GLR 220 which may be used in exemplary system 800 (see FIG. 8A) for tagging identified utility assets or objects related to underground utilities. Retractable legs 826 are shown in an un-stored position which allows GLR 220 to be self-standing, if needed. In this embodiment, mounting device 820 is shown attached to a position above the mast 827 of GLR 220. Phone holder 821 is shown with phone (aka mobile device) 810 inserted, and positioned in a relatively sideways position, and positioned at relative forward angle away from GLR 220. The location of mounting device 820 has been shown both on and above mast 827 for convenience only. However, it would be understood by one of ordinary skill in the art that mounting device 820 could be positioned in many different locations on GLR 820, depending on the specific application.

Figure 9A:
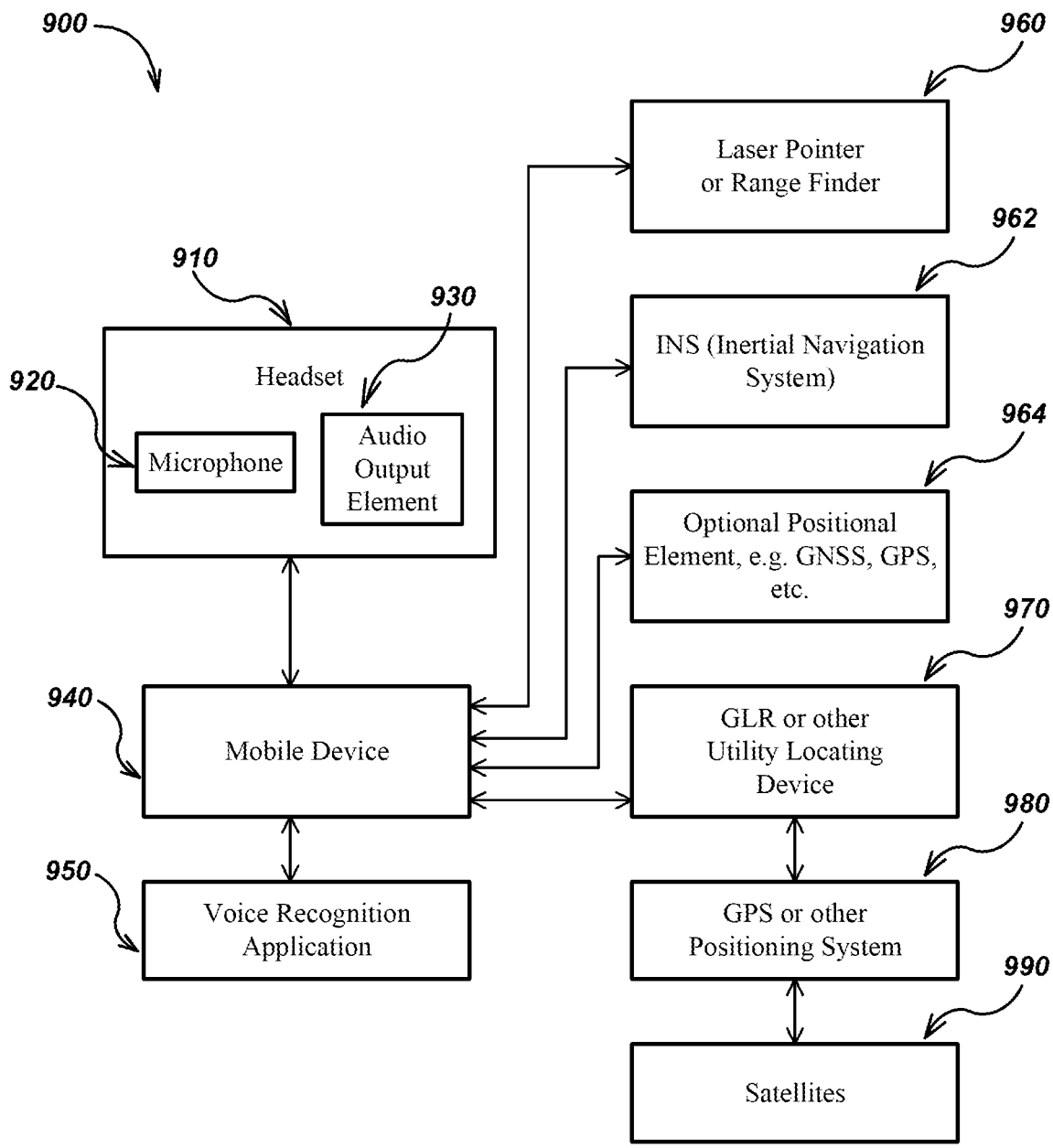
FIG. 9A is an illustration of an embodiment 900 of components in a system for tagging utility assets or objects, in accordance with certain aspects of the present invention.

FIG. 9A illustrates components in an embodiment 900 in a system for tagging utility assets or objects. A headset 910 with an integrated microphone 920 and an audio output element 920 and an audio output element 930, may be provided. The headset is configured to communicate with a mobile phone or other mobile device 940. Mobile device 940 is configured to communicate with a voice recognition application 950 which may be integral with the mobile device 940, or may be remotely located elsewhere, e.g. in the cloud, or in another device. A laser pointer or range finder 960, as well as a GLR or other utility locating device 970 are both configured to communicate with mobile device 940. An orientation or pose element, e.g. an INS (Inertial Navigation System) 962 which may include a compass is provided, and may be integrated with GLR 970. Optionally, a positioning system, e.g. GNSS, GPS, or other well known positioning system 964, may be integrated with GLR 970. The GLR or other utility locating device 970 may include GPS or other positioning systems 980. GPS 980 is configured to communicate with appropriate positioning satellites 990. It would be understood by those of ordinary skill in the art that communications between components can hardwired or configured to communicate wirelessly using well known protocols such as Bluetooth, WiFi, NFC, etc.

Figure 9B:
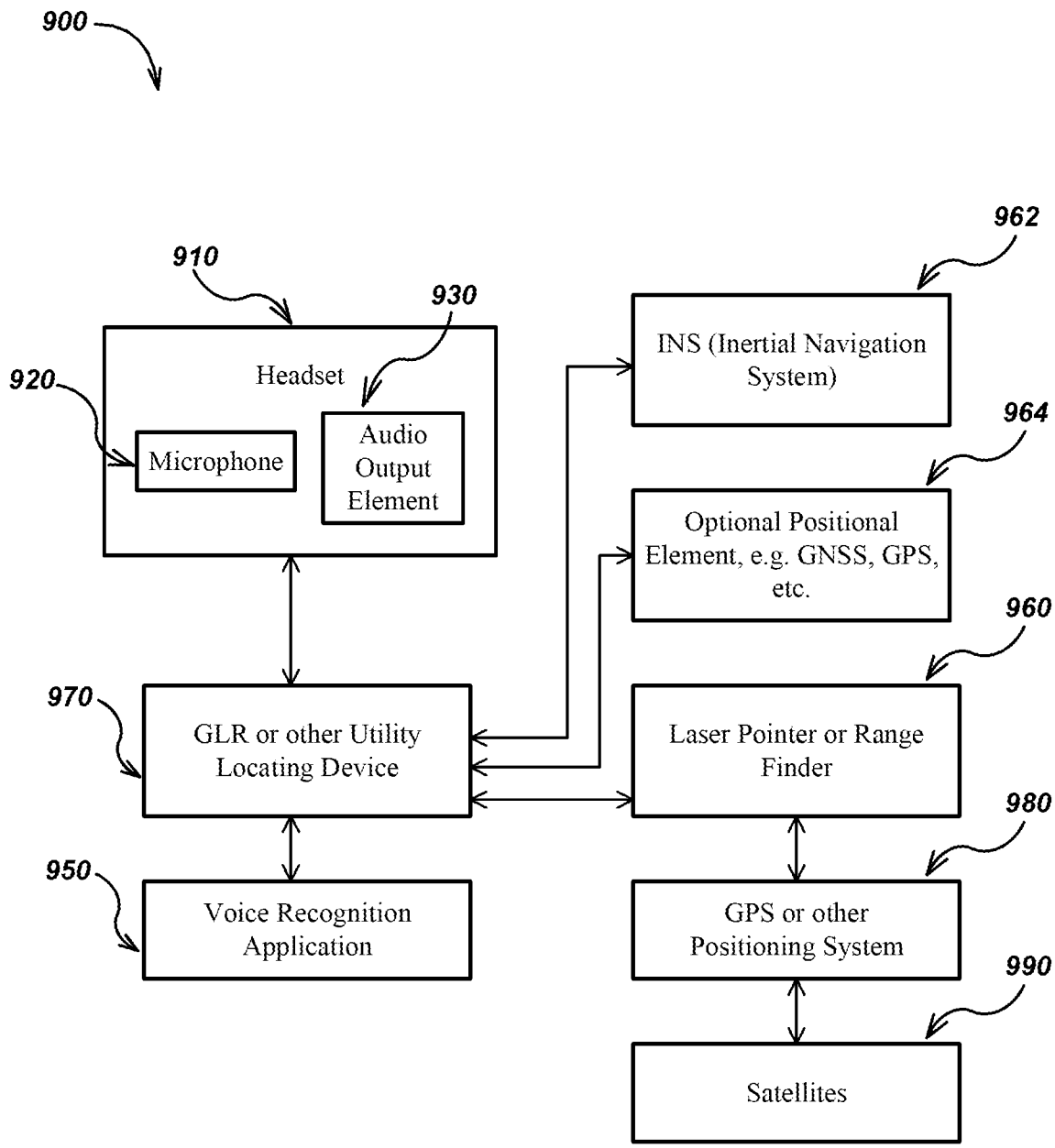
FIG. 9B is an illustration of an alternate embodiment 900 of components in a system for tagging utility assets or objects, in accordance with certain aspects of the present invention.

FIG. 9B illustrates components in an embodiment 900 in a system for tagging utility assets or objects. A headset 910 with an integrated microphone 920 and an audio output element 920 and an audio output element 930, may be provided. The headset is configured to communicate with a GLR or other utility locating device 970. GLR or other utility locating device 970 is configured to communicate with a voice recognition application 950 which may be integral with the GLR or other utility locating device 970, or may be remotely located elsewhere, 960 communicate with the GLR or other utility locating device 970. GLR or other utility locating device 970 GPS or other positioning systems 980. GPS 980 is configured to communicate with appropriate positioning satellites 990. It would be understood by those of ordinary skill in the art that communications between components can hardwired or configured to communicate wirelessly using well known protocols such as Bluetooth, WiFi, NFC, etc.

Figure 10:
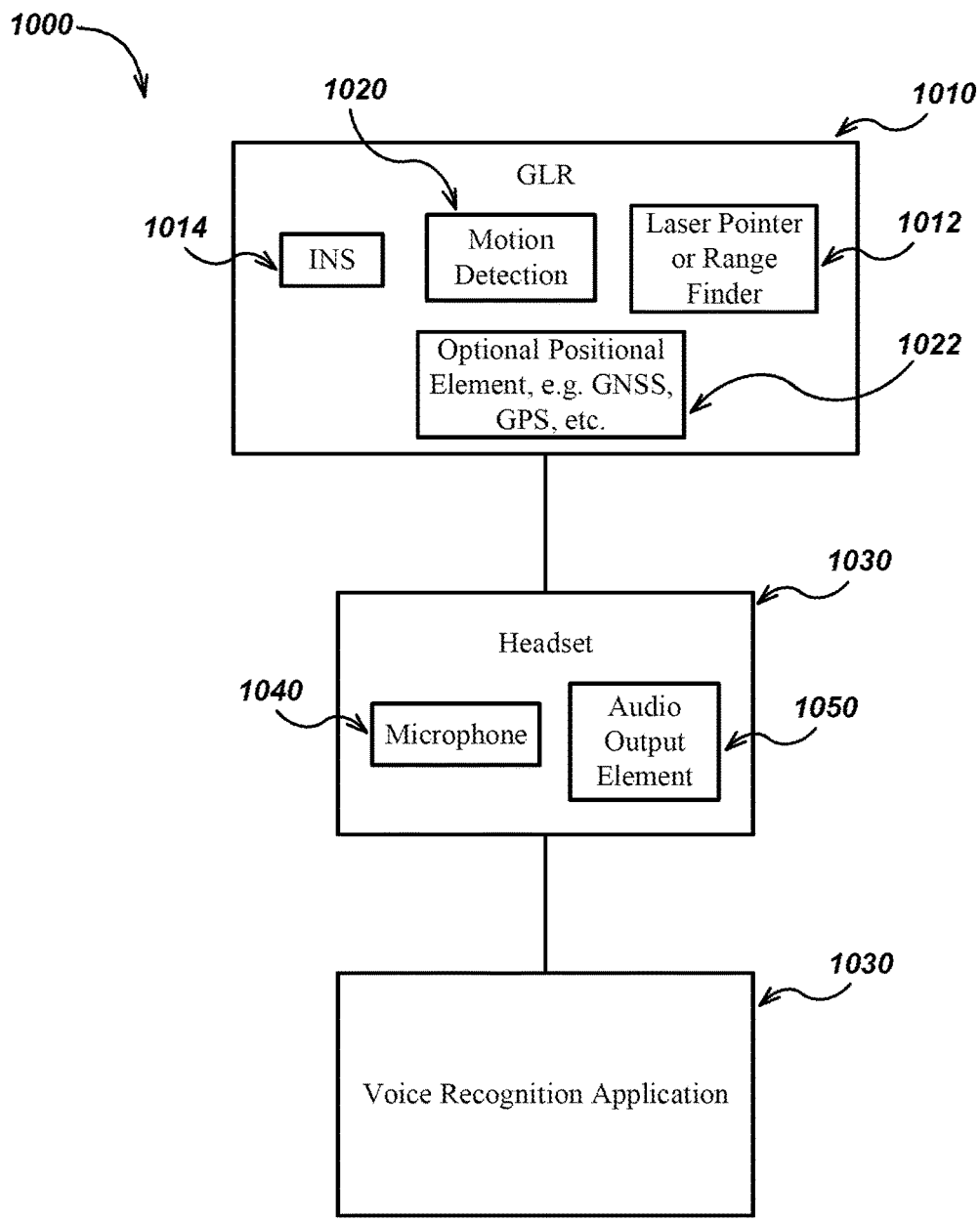
FIG. 10 is an illustration of an embodiment of a system for tagging identified utility assets or objects related to underground utilities, in accordance with certain aspects of the present invention. motion detection may be used for tagging a utility object.

FIG. 10 illustrates details of an exemplary system 1000 of is an illustration of an embodiment of a system for tagging identified utility assets or objects related to underground utilities. A GLR 1010 or other utility locator or system may be integrated with a laser pointer or range find 1012. The GLR may also include an orientation or pose element, e.g. an INS (Inertial Navigation System) 1014 which may include a compass, a motion detection element 1020, and optionally a positioning system, e.g. GNSS, GPS, or other well known positioning system 964. As the GLR 1010 is collecting utility data, the GLR 1010 may be placed in a stationary position by setting it on the ground or on an object, or by using a tripod or other type of stand (not shown). Once the motion detection element determines that the GLR 1010 has stopped moving, then processing software, which may be integral with the GLR 1010 or remote, will automatically determine that a utility object at the location of the GLR 1010 is to be tagged, and the next thing a user says by speaking into a headset 1030 with a microphone 1040 would automatically be considered as an annotation for the utility object. The system 1000 may include an audio output element 1050 such one or more speakers and/or one or more bone conduction elements. A voice recognition application or software 1060 is provided to interpret voice spoken by a user into microphone 1040. The voice recognition application or software 1060 may repeat voice spoken into microphone 1040 back to the user via audio output element 1050. In some embodiments, stopping the process of tagging a utility object could be triggered by sensing movement again from the motion detection element 1020 when the user picks up the GLR 110 again.

Figure 11:
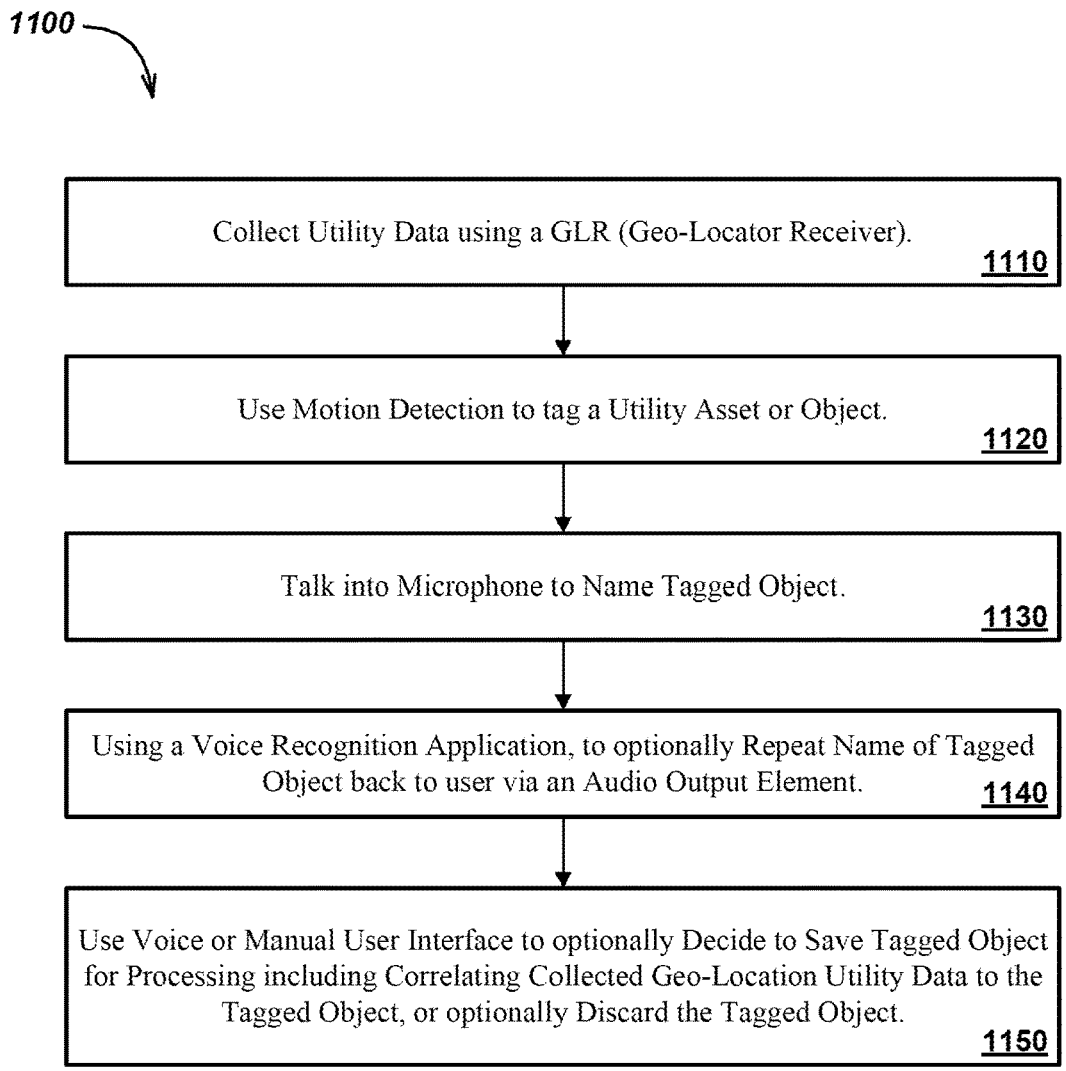
FIG. 11 is an illustration of an embodiment of a method of tagging visually identifiable objects using natural language in a utility locating system, in accordance with certain aspects of the present invention.

FIG. 11 illustrates details of an exemplary method 1100 of tagging visually identifiable objects using natural language in a utility locating system. The method starts at block 1110 collecting utility data using a GLR (Geo-Locator Receiver)

and proceeds to block 1120 where motion detection is used to determine that a utility asset or object should be tagged. For instance, processing software located in the GLR or remotely may determine that the GLR has stopped moving, and the location of the GLR once it has stopped may be considered the location of a utility asset or object to be tagged. The method then proceeds to block 1130 where a utility service worker or other user talks into a microphone to annotate/name the tagged object. In some embodiments, a noise-cancelling microphone, or noise cancelling software may be provided to improve the quality of audio spoken into the microphone. In block 1140, a voice recognition application is used to optionally repeat the name of the tagged object back to a user via an audio output element. Finally, the method proceeds to block 1150 where the user uses a voice or manual user interface to optionally decide to save the tagged object for processing including correlating collected Geo-Location Utility Data to the tagged object, or optionally chooses instead to discard the tagged object.

FIG. 12 illustrates details of an exemplary method 1200 for using voice editing to correct text related to a tagged utility asset or object. The method starts at block 1210 where a user talks into a microphone to name a tagged object. Next in block 1220 a voice recognition application or software is used to optionally repeat the audio name/description of the tagged object spoken into the microphone back to the user using an audio output element. In block 1230, a voice editing application or software is provided to optionally allow a user to verbally correct any name/description text as needed. Finally, in block 1240, a voice or manual user interface is provided to allow a user to optionally save or discard a tagged utility asset or object.

Figure 13:
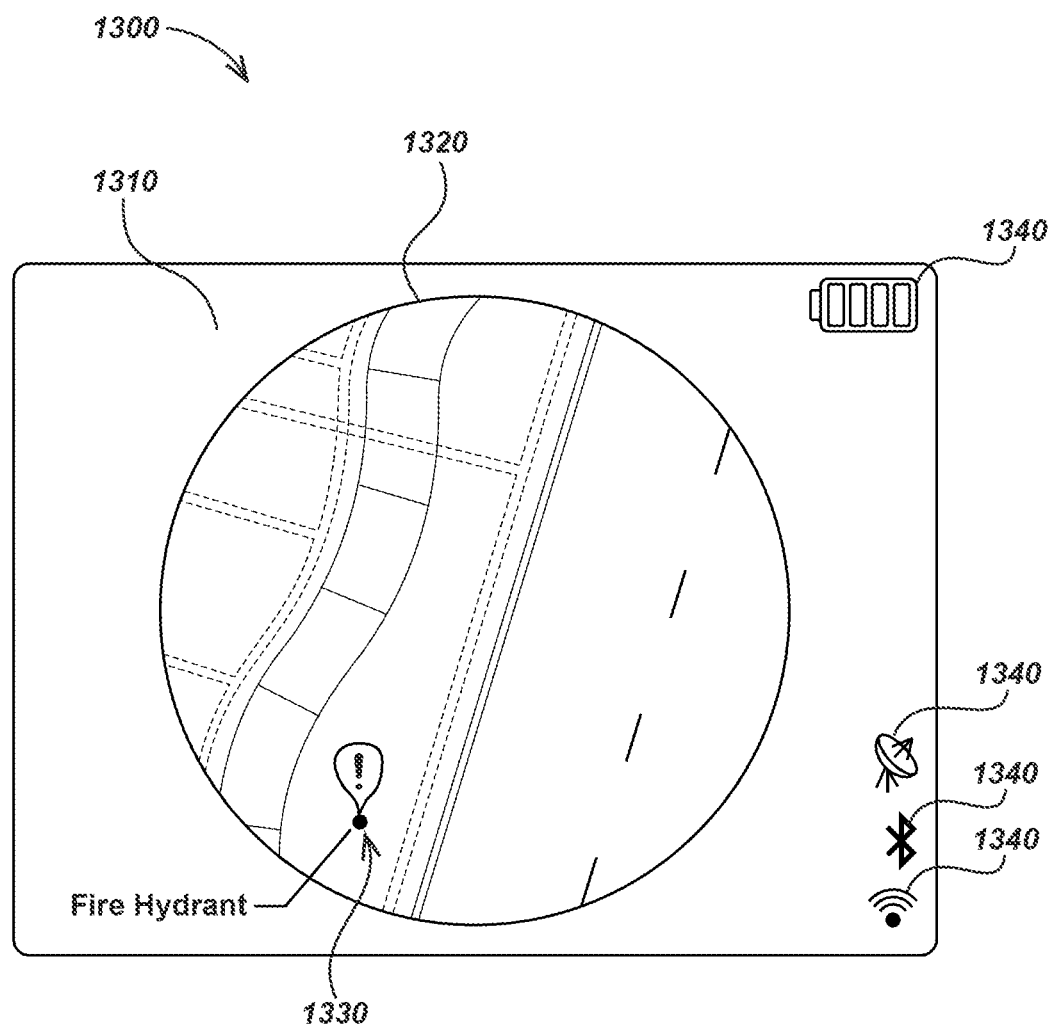
FIG. 13 is an illustration of an embodiment of a visual display of a tagged utility asset or object with location mapping, in accordance with certain aspects of the present invention.

FIG. 13 illustrates details of an exemplary embodiment 1300 of a visual display o integral with a mobile phone or other device, integral or attached to GLR or other utility locating f a tagged utility asset or object with location mapping. A display 1310 may be provided device or system, or integral with or attached to a remote user interface. The display 1310 may be configured to render a map 1320 showing the location of a tagged utility asset or object 1330 on the map 1320. As an example, utility object may be a Fire Hydrant. In some embodiments, text may be provided on display 1310 to label the tagged object 1330 on map 1320. The map 1320 may be a computer generated map, a scanned in map, or any other kind of map well known in the art. The display 1310 may also be configured to show information symbols. Examples of such symbols include but are not limited to battery power, satellite, Bluetooth, WiFi or other connectivity symbols, text, location coordinates, time, date, etc. Furthermore, the display 1310 may include touch screen, zooming, map scrolling, and other display, and or mapping functionality. The display may also include a touch screen or actual keyboard (not shown).

Figure 14:
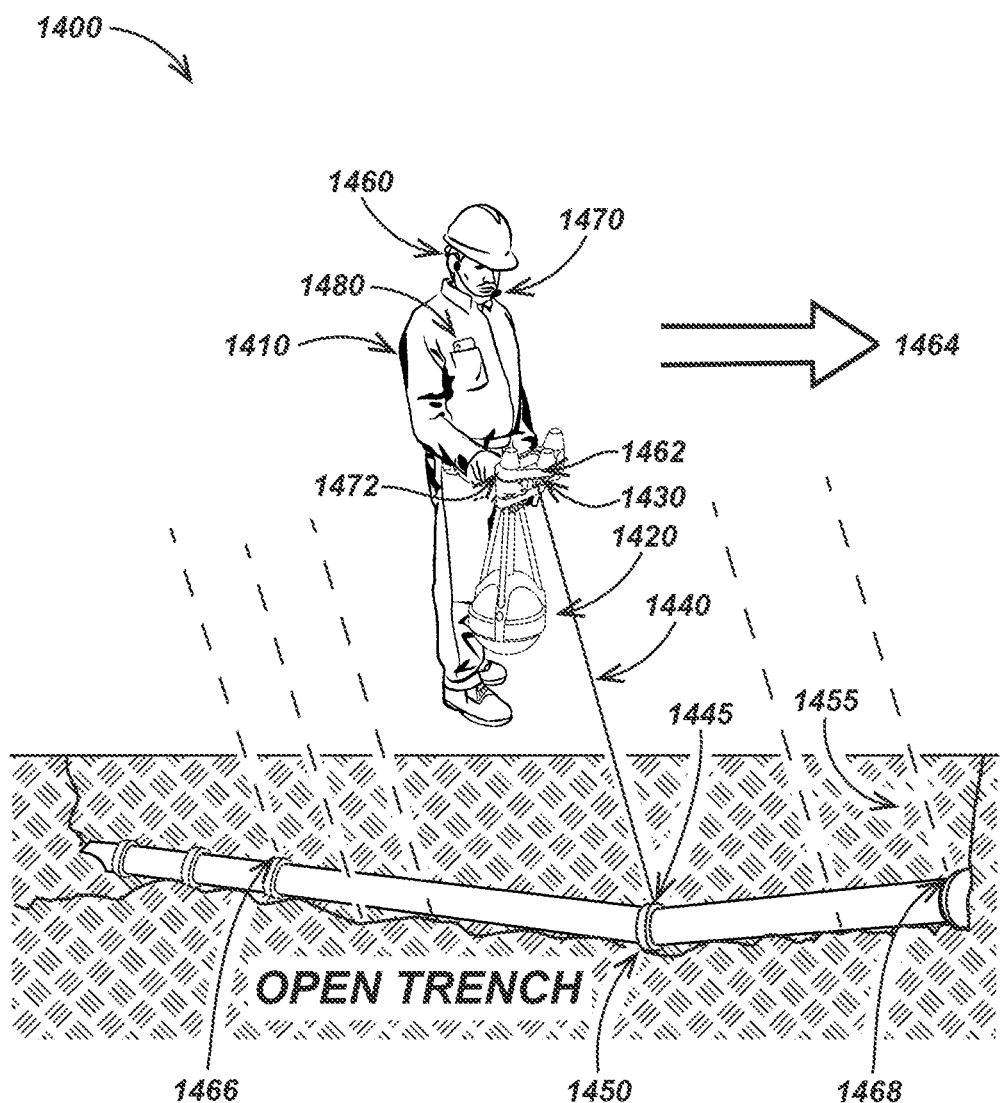
FIG. 14 is an illustration of an embodiment of a system for tagging identified utility assets or objects related to underground utilities, in accordance with certain aspects of the present invention.

FIG. 14 illustrates details of an exemplary embodiment 1400 of a system for tagging identified utility assets or objects related to underground utilities, in accordance with certain aspects of the present invention. A utility service worker or other user 1410 is shown collecting data with a GLR 1420 that is related to an underground utility. The user 1410 is shown holding a laser pointer or range finder 1430 integral with GLR 1420. The user 1410 may tag a utility asset by aiming laser beam 1440 at the utility asset, placing laser point 1445 on the utility asset or object, in this case pipe fitting, joint, or overlap 1450 that is exposed in open trench 1455. Then, user 1410 may tag pipe joint 1450 by using a trigger or other laser pointer activation control (not shown), speaking into a headset 1460 which includes a boom microphone 1470, and naming (annotating) the pipe fitting 1450.

In one embodiment, one or more cameras or imaging sensors 1462 located in the GLR or remotely, may be used to generate images related to a tagged utility object. A user 1410 may use camera 1462 in tracing mode 1464 to collect a continuous stream of points as they are walking. Tracing mode may include a start trace 1466 and an end trace 1468 location. Pipe joint 1450 may be tagged with a key press using tag key 1472 which may be located on GLR 1420.

A voice recognition application running on a mobile phone 480 and/or the GLR 220 and/or other computing device will interpret the speech used to name pipe joint 1450, and optionally repeat it back to user 1410 via an audio output device in headset 1460. The user 1410 may then optionally accept or reject the tagged object by speaking an audio command into boom microphone 1470.

One or more processors (not shown) may be integral with one or more of headset 1460, laser pointer 1430, mobile device 1480, or GLR 1420.

The scope of the invention is not intended to be limited to the aspects shown herein but are to be accorded the full scope consistent with the disclosures herein and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the disclosures herein and in the appended drawings.

We claim:

1. A utility asset annotating system for tagging visually identifiable objects using natural language comprising:
    a locating means comprising:
        one or more antennas for collecting utility data;
        a GNSS positioning system;
        an INS system for determining orientation;
        a green laser pointer integrated with the locating means for aiming at a visually identifiable object to be tagged ("tagged object"), wherein the green laser pointer is positioned to point downward and forward in a known positional relationship to the one or more antennas;
        a means for determining an associated distance between the green laser pointer and the tagged object;
        a keypad button associated with tagging an object;
    a wireless stereo headset in communication with the locating means, wherein the wireless stereo headset comprises two audio output elements and a microphone; and
    a voice recognition element, application, or software program stored in one or more memories associated with one or more processors integrated with the locating means, integrated with a mobile device, or remotely in a cloud wherein the wireless stereo headset is in communication with the voice recognition element.

2. The system of claim 1, further comprising a red laser.

3. The system of claim 1, wherein the two audio output elements comprise speakers.

4. The system of claim 1, wherein the two audio output elements comprise bone conduction speakers.

5. The system of claim 1, wherein a distance measuring means is the green laser pointer.

6. The system of claim 2, wherein a distance measuring means is one or more of the green laser pointer and the red laser.

7. The system of claim 1, further comprising a second keypad button associated with accepting or rejecting tagged objects.

8. The system of claim 7, wherein location and characteristic data of accepted tagged objects are provided to mapping software.

9. The system of claim 1, wherein a voice recognition software comprises one or more of SIRI, ALEXA, BIXBY or other commercially available voice recognition software which may run locally, on the cloud, or both.

10. The system of claim 1, wherein the wireless stereo headset communicates via Bluetooth.

11. The system of claim 1, wherein the microphone or the two audio output element further comprise noise cancellation.

12. The system of claim 1, further comprising one or more imaging elements configured to capture an image of a tagged object.

13. The system of claim 1, wherein an imaging element is configured to capture one or more of photographs or video of the tagged object.

14. The system of claim 1, further comprising a remote user interface including at least one control for accepting or rejecting tagged objects.

15. The system of claim 1, comprising a handheld laser that includes position and orientation means.

16. The system of claim 15, where in the handheld laser is configured to interface with the voice recognition element and the locating means.

17. The system of claim 1, wherein a receiving element is or includes one or more utility locators having at least one antenna and associated circuitry configured to sense magnetic signals from utility lines and determine locations of utility lines relative to the locator.

18. The system of claim 1, wherein the mobile device comprises one or more of a smartphone, laptop, or computer tablet.

19. The system of claim 18, further comprising a docking mechanism or slot for docking with one or more of the smartphone, laptop, or computer tablet.

20. The system of claim 1, wherein the wireless stereo headset is an open-ear design headset.

21. A method for tagging visually identifiable objects using natural language in a utility locating system comprising:
collecting utility data with a utility locator including one or more one motion detectors;
tagging a visually identifiable object by sensing motion using the one or more motion detectors;
naming the visually identifiable tagged object by talking into a microphone;
repeating the name of the visually identifiable tagged object back to a user via an audio output element; and
selecting on a user interface whether to save the visually identifiable tagged object for processing or discard the visually identifiable tagged object.

22. The system of claim 21, further comprising the mobile device.

23. The system of claim 22, wherein the mobile device is a cellular phone or mobile phone.

24. The system of claim 23, wherein the mobile device includes an imaging element is configured to capture one or more of photographs or video of the visually identifiable tagged object.

25. The method of claim 21, wherein the microphone is incorporated into, or in communication with a mobile device.

26. The method of claim 25, wherein the mobile device is a cellular phone or mobile phone.

* * * * *